(12) United States Patent  
Gambini et al.

(10) Patent No.: US 11,197,348 B2  
(45) Date of Patent: Dec. 7, 2021

(54) METHODS, SYSTEMS AND CONTROL UNITS FOR EXCHANGING BACKHAUL INFORMATION BETWEEN RADIO NODES

(71) Applicant: HUAWEI TECHNOLOGIES CO., LTD., Shenzhen (CN)

(72) Inventors: Jonathan Gambini, Segrate (IT); Renato Lombardi, Segrate (IT)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/846,435

(22) Filed: Apr. 13, 2020

(65) Prior Publication Data

US 2020/0245413 A1    Jul. 30, 2020

Related U.S. Application Data

(63) Continuation of application No. PCT/EP2017/076239, filed on Oct. 13, 2017.

(51) Int. Cl.
*H04W 88/14* (2009.01)
*H04W 40/24* (2009.01)
*H04W 72/04* (2009.01)

(52) U.S. Cl.
CPC .......... *H04W 88/14* (2013.01); *H04W 40/24* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2010/0002656 A1* | 1/2010 | Ji | H04W 72/082 370/336 |
| 2012/0063383 A1* | 3/2012 | Barbieri | H04W 72/082 370/315 |
| 2013/0044654 A1 | 2/2013 | Chen et al. | |

OTHER PUBLICATIONS

O. Tipmongkolsilp, S. Zaghloul and A. Jukan, "The Evolution of Cellular Backhaul Technologies: Current Issues and Future Trends," in IEEE Communications Surveys and Tutorials, vol. 13, No. 1, pp. 97-113, First Quarter 2011, total 17 pages.

(Continued)

*Primary Examiner* — Jamaal Henson
(74) *Attorney, Agent, or Firm* — Hauptman Ham, LLP

(57) ABSTRACT

Methods, systems and control units for controlling radio nodes are provided. In various embodiments, the radio nodes exchange backhaul information with at least one other radio node jointly over a first communication link established using a first frequency bandwidth ($F_{BACKHAUL}$). In those embodiments, a second communication link is established using a second frequency bandwidth ($F_{END-USER}$) that is used by the radio nodes to provide uplink and downlink radio access connectivity to one or more end-user nodes using the second frequency bandwidth ($F_{END-USER}$). In some examples, the second communication link may only be established if the quality of the first communication link falls below a minimum quality threshold. In some examples, the portion of the second frequency bandwidth used to establish the second communication link may be dynamically allocated based at least on the quality of the first communication link.

14 Claims, 11 Drawing Sheets

(56) References Cited

OTHER PUBLICATIONS

ETSI White paper No. 9, E-Band and V-Band—Survey on status of worldwide regulation, Jun. 2015, total 40 pages.

S. Carpenter, Z. He, M. Bao and H. Zirath, A Highly Integrated Chipset for 40 Gbps Wireless D-Band Communication Based on a 250 nm InP DHBT Technology, IEEE Compound Semiconductor Integrated Circuit Symposium (CSICS), pp. 1-4, 2014, total 4 pages.

X. Ge, H. Cheng, M. Guizani and T. Han, 5G wireless backhaul networks: challenges and research advances, in IEEE Network, vol. 28, No. 6, pp. 6-11, Nov.-Dec. 2014, total 6 pages.

ETSI Technical Specification 136 104, version 13.5.0, 2016, total 221 pages.

\* cited by examiner

METHODS, SYSTEMS AND CONTROL UNITS FOR EXCHANGING BACKHAUL INFORMATION BETWEEN RADIO NODES

CROSS-REFERENCE TO RELATED APPLICATIONS

This application is a continuation of International Application No. PCT/EP2017/076239, filed on Oct. 13, 2017, the disclosure of which is hereby incorporated by reference in its entirety.

FIELD

This application relates to wireless telecommunications and, more particularly, to radio backhauling architectures for connecting remote radio nodes to core networks.

BACKGROUND

Wireless communications networks, such as cellular networks, typically comprise a plurality of distributed radio nodes (e.g. base stations) which are connected to a core network. Each radio node provides wireless communications capabilities to end-user nodes within a particular geographic region. In other words, each radio node connects end-user nodes to the core network via wireless communication links. The radio nodes are typically connected to the core network via one or more backhaul links that are established between the radio node and a network device (e.g. a base station controller) that is connected to, or has access to, the core network. The information that is exchanged over the backhaul network is referred to herein as backhaul information.

Backhaul information is ideally exchanged over one or more fibre optic backhaul links to achieve high throughput of backhaul information between the remote radio node and the corresponding network device. However, establishing a fibre optic backhaul link is not always feasible, or practical, due to, for example, high installation costs. Accordingly, in many cases backhaul information is exchanged over one or more point-to-point radio backhaul links established between a remote radio node and an anchor radio node (a radio node that is connected to or has access to the core network).

Reference is now made to FIG. 1A which illustrates a first example system 100 for exchanging backhaul information over point-to-point radio backhaul links that is known to the Applicant. The statement that a feature (e.g. system 100) is known to the Applicant is not an admission that the feature is well-known. In this example, which may be referred to as a microwave backhauling system, backhaul information is exchanged between a remote radio node 102 and an anchor radio node 104 over a dedicated point-to-point radio backhaul link 106 established using a frequency bandwidth ($F_{BACKHAUL}$) which is separate and distinct from the frequency bandwidth ($F_{END-USER}$) used by the radio nodes 102, 104 to provide uplink and downlink radio access connectivity 108 to one or more end-user nodes 110. The frequency bandwidth ($F_{BACKHAUL}$) used to establish the dedicated point-to-point radio backhaul link 106 is typically in the microwave frequency range of the electromagnetic spectrum. Due to technology evolution and availability of wide channel bandwidths, the V-band (57-66 GHz) and the E-Band (71-76 GHz) have been identified as being suitable for establishing high-throughput dedicated backhaul communication links between remote radio nodes and anchor radio nodes. The W-band (92-114.5 GHz) and D-band (130-174.7 GHz) have also been identified as being potentially suitable for use in establishing dedicated backhaul communications links between remote radio nodes and anchor radio nodes.

However, radio backhaul links operating over high frequency bandwidths, such as the E-band, W-band or D-band, can generally provide high capacity, but they are limited in terms of reach and coverage due to poor link budget and severe rain fading that can affect the propagation over high frequency bandwidths. Furthermore, the light licensing paradigm and the lack of a harmonized regulation characterizing some frequency bands, such as the V-band, inherently lead to over-conservative link planning designs to counteract the additional interference that may be produced by other co-channel systems. These factors make the throughput availabilities typically required to implement microwave backhaul links very challenging, particularly in light of the inter-site distance (e.g. 300-500 m for urban environments and 800-3000 m for rural environments) expected in future wireless networks.

Reference is now made to FIG. 1B which illustrates a second example system 120 for exchanging backhaul information over point-to-point radio backhaul links that is known to the Applicant. In this example, which may be referred to as a dual-band backhauling system, backhaul information is exchanged between a remote radio node 102 and an anchor radio node 104 over at least two dedicated point-to-point radio backhaul links 106, 122 established using two disjoint frequency bands ($F_{BACKHAUL}$, $F_{BACKHAUL2}$) that are separate and distinct from the frequency bandwidth ($F_{END-USER}$) used by the radio nodes 102, 104 to provide uplink and downlink radio access connectivity 108 to the end-user nodes 110. The two frequency bandwidths ($F_{BACKHAUL}$, $F_{BACKHAUL2}$) used to establish the radio backhaul links 106, 122 are typically characterized by different propagation and regulatory conditions. Dual-band backhauling systems generally increase the reliability of backhaul throughput over systems, such as system 100 of FIG. 1A, which use a single frequency bandwidth to establish the backhaul link(s), by exploiting the diverse channel conditions over the two disjoint frequency bands. However, such dual-band backhauling systems 120 are generally more complex than systems, such as system 100 of FIG. 1A, which use a single frequency bandwidth to establish the radio backhaul link(s), since the radio nodes require additional hardware and logic to be able to support communications over multiple frequency bandwidths.

The embodiments described below are provided by way of example only and are not limiting of implementations which solve any or all of the disadvantages of radio backhauling architectures and systems known to the Applicant.

SUMMARY

It is an object to have a backhaul architecture which enables high capacity backhaul links with higher minimum guaranteed throughputs compared to known microwave backhauling systems, such as the system shown FIG. 1A.

The foregoing and other objects are achieved by the features of the independent claims. Further implementation forms are apparent from the dependent claims, the detailed description and the figures.

A first aspect provides a control unit for controlling a radio node comprising a first radio unit and a second radio unit, the control unit configured to: generate and output one or more control signals to cause: the first radio unit to exchange a first portion of backhaul information with another radio node over a first communication link established using a first frequency bandwidth; the second radio unit to provide uplink and downlink radio access connectivity to one or more end-user nodes using a second frequency bandwidth; and the second radio unit to exchange a second portion of the backhaul information with the other radio node over a second communication link established using the second frequency bandwidth.

The control unit may be configured to dynamically allocate none or a portion of the second frequency bandwidth for use in establishing the second communication link based at least on a determined quality of the first communication link.

The control unit may be configured to allocate none of the second frequency bandwidth for use in establishing the second communication link in response to determining that a quality of the first communication link is greater than or equal to a minimum quality, and allocate a portion of the second frequency bandwidth for use in establishing the second communication link in response to determining that the quality of the first communication link is less than the minimum quality.

The control unit may be configured to determine that the quality of the first communication link is less than the minimum quality in response to determining that a throughput of backhaul information transmitted from the first radio unit over the first communication link is less than a first threshold, and/or that a throughput of backhaul information received by the first radio unit over the first communication link is less than a second threshold.

The control unit may be configured to allocate none or a portion of the second frequency bandwidth for establishing the second communication link by time partitioning a radio access frame into a plurality of epochs and outputting one or more control signals to cause the second radio unit to perform, in each of the plurality of epochs, one or more of: provide uplink radio access connectivity to one or more end-user nodes using the second frequency bandwidth, provide downlink radio access connectivity to one or more end-user nodes using the second frequency bandwidth, transmit backhaul information to the other radio node using the second frequency bandwidth, and receive backhaul information from the other radio node using the second frequency bandwidth based on at least a quality of the first communication link.

The control unit may be configured to, in response to determining that the quality of the first communication link is greater than or equal to the minimum quality, divide a radio access frame into two epochs and output one or more control signals to cause the second radio unit to: only provide downlink radio access connectivity to the one or more end-user nodes in one epoch of the two epochs; and only provide uplink radio access connectivity to the one or more end-user nodes in the other epoch of the two epochs.

The control unit may be configured to, in response to determining that the quality of the first communication link is less than the minimum quality and that the second radio unit does not support spatial multiplexing, divide a radio access frame into four epochs and output one or more control signals to cause the second radio unit to: provide downlink radio access connectivity to the one or more end-user nodes using the second frequency bandwidth in one epoch of the four epochs; provide uplink radio access connectivity to the one or more end-user nodes using the second frequency bandwidth in another epoch of the four epochs; transmit backhaul information to the other radio node using the second communication link in yet another epoch of the four epochs; and receive backhaul information from the other radio node via the second communication link in the remaining epoch of the four epochs.

The control unit may be configured to, in response to determining that the quality of the first communication link is less than the minimum quality and that the second radio unit supports spatial multiplexing, divide a radio access frame into four epochs and output one or more control signals to cause the second radio unit to: concurrently provide downlink radio access connectivity to one or more end-user nodes and transmit backhaul information to the other radio node using the second frequency bandwidth during one epoch of the four epochs; concurrently provide uplink radio access connectivity to one or more end-user nodes and receive backhaul information from the other radio node using the second frequency bandwidth during another epoch of the four epochs; only provide downlink radio access connectivity to one or more end-user nodes using the second frequency bandwidth during yet another epoch of the four epochs; and only provide uplink radio access connectivity to one or more end-user nodes using the second frequency bandwidth during the remaining epoch of the four epochs.

The second radio unit may be configured to provide uplink and downlink radio access connectivity to a plurality of end-user nodes; and the one or more control signals may be configured to cause the second radio unit to provide downlink radio access connectivity to a first subset of the plurality of end-user nodes during the one epoch and provide downlink radio access connectivity to a different subset of the plurality of end-user nodes in the yet another epoch so as to maximize a function of one or more of an uplink radio access connectivity throughput provided to the plurality of end-user nodes, a downlink radio access connectivity throughput provided to the plurality of end-user nodes, a throughput of the backhaul information transmitted to the other radio node via the second communication link over the second frequency bandwidth, and a throughput of the backhaul information received from the other radio node via the second communication link over the second frequency bandwidth.

The control unit may be configured to, in response to determining that the quality of the first communication link is less than the minimum quality and that the second radio unit supports spatial multiplexing, divide a radio access frame into two epochs and output one or more control signals to cause the second radio unit to: concurrently provide downlink radio access connectivity to one or more end-user nodes and transmit backhaul information to the other radio node using the second frequency bandwidth during one epoch of the two epochs; and concurrently provide uplink radio access connectivity to one or more end-user nodes and receive backhaul information from the other radio node using the second frequency bandwidth during another epoch of the two epochs.

The control unit may be configured to select a duration of the plurality of epochs so as to maximize a function of one or more of an uplink radio access connectivity throughput provided to the one or more end-user nodes, a downlink radio access connectivity throughput provided to the one or more end-user nodes, a throughput of the backhaul information transmitted to the other radio node via the second communication link over the second frequency bandwidth, and a throughput of the backhaul information received from the other radio node via the second communication link over the second frequency bandwidth.

The control unit may be configured to select a duration of each epoch based at least on one or more of: an uplink radio access connectivity throughput provided by the second radio unit to the one or more end-user nodes, a downlink radio access connectivity throughput provided by the second radio unit to the one or more end-user nodes, an uplink radio access connectivity throughput provided by the other radio node to one or more end-user nodes, a downlink radio access connectivity throughput provided by the other radio node to one or more end-user nodes, a throughput of the backhaul information transmitted to the other radio node via the second communication link over the second frequency bandwidth, a throughput of the backhaul information received from the other radio node via the second communication link over the second frequency bandwidth, a throughput of backhaul information transmitted to the other radio node via the first communication link over the first frequency bandwidth, and a throughput of backhaul information received from the other radio node via the first communication link over the first frequency bandwidth.

The control unit may be configured to periodically determine the quality of the first communication link and update the allocation based on the determination.

The control unit may be configured to determine the quality of the first communication link and update the allocation after N radio access frames, wherein N is an integer greater than or equal to one.

The second radio unit may be configured to provide uplink and downlink radio access connectivity to a plurality of end-user nodes; and the one or more control signals may be configured to cause the second radio unit to provide uplink radio access connectivity to a first subset of the plurality of end-user nodes during the another epoch and provide uplink radio access connectivity to a different subset of the plurality of end-user nodes in the remaining epoch so as to maximize a function of one or more of an uplink radio access connectivity throughput provided to the plurality of end-user nodes, a downlink radio access connectivity throughput provided to the plurality of end-user nodes, a throughput of the backhaul information transmitted to the other radio node via the second communication link over the second frequency bandwidth, and a throughput of the backhaul information received from the other radio node via the second communication link over the second frequency bandwidth.

The control unit may be configured to select a duration of each epoch so as to maximize a function of an uplink radio access connectivity throughput provided to the one or more end-user nodes and/or a downlink radio access connectivity throughput provided to the one or more end-user nodes, while guaranteeing a minimum quality to at least one of: uplink radio access connectivity throughput provided to the one or more end-user nodes by the radio node, downlink radio access connectivity throughput provided to the one or more end-user nodes by the radio node, uplink radio access connectivity throughput provided to one or more end-user nodes by the other radio node, and downlink radio access connectivity throughput provided to one or more end-user nodes by the other radio node.

The backhaul information may comprise one or more subsets of backhaul information each associated with a priority, and the control unit may be configured to select one or more subsets to be transmitted over the second communication link based on the priority associated with the one or more subsets and output one or more control signals to cause the selected subsets to be transmitted by the second radio unit over the second communication link.

The control unit may be configured to select a duration of the epochs within an infinite resolution or within a discrete set with a finite number of possibilities.

When the radio node supports spatial multiplexing the one or more control signals generated by the control unit may be adapted for the specific multiplexing mode supported by the radio node.

The other radio node may be configured to provide uplink and downlink radio access connectivity to one or more end-user nodes using the second frequency bandwidth and the control unit may be further configured to generate the first threshold as a function of downlink radio access connectivity spectral efficiencies provided by the other radio node to the one or more end-user nodes using the second frequency bandwidth, and generate the second threshold as a function of uplink radio access connectivity spectral efficiencies provided by the other radio node to the one or more end-user nodes using the second frequency bandwidth.

A second aspect provides a radio node comprising: a first radio unit configured to exchange a first portion of backhaul information with another radio node over a first communication link established using a first frequency bandwidth; and a second radio unit configured to: provide uplink and downlink radio access connectivity to one or more end-user nodes using a second frequency bandwidth, the second frequency bandwidth being different from the first frequency bandwidth; and exchange a second portion of the backhaul information with the other radio node over a second communication link established using the second frequency bandwidth.

The first portion of the backhaul information may be a portion of the backhaul information that can be reliably carried over the first frequency bandwidth, and the second portion of the backhaul information corresponds to the amount of backhaul information that can be reliably carried over the second frequency bandwidth.

The radio node may further comprise an interface unit that is configured to adapt information received via one of the first and second radio units so that it is suitable for transmission by the other of the first and second radio units.

The second radio unit may comprise an antenna unit that comprises a plurality of antenna elements to support multiple-input-multiple-output communications.

A third aspect provides a system comprising the radio node of the second aspect and the control unit of the first aspect, wherein the control unit is configured to control the radio node.

The radio node may be connected to a core network by a fibre link; and the system may further comprise the other radio node, the other radio node not being directly connected to the core network by a fibre link, the other radio node comprising: a third radio unit configured to exchange the first portion of backhaul information with the radio node using the first frequency bandwidth; and a fourth radio unit configured to: provide uplink and downlink radio access connectivity to one or more end-user nodes using the second frequency bandwidth; and exchange the second portion of the backhaul information with the radio node (202-A) using the second frequency bandwidth.

A fourth aspect provides a method of exchanging backhaul information between a radio node and another radio node, the method comprising: exchanging a first portion of the backhaul information over a first communication link established using a first frequency bandwidth; and exchanging a second portion of the backhaul information over a second communication link established using a second frequency bandwidth, the second frequency bandwidth being different from the first frequency bandwidth and being used by at least one of the radio nodes to provide uplink and downlink radio access connectivity to one or more end-user nodes.

According to further implementations of the fourth aspect, the method further comprises steps for carrying out the functionalities of the units described above in connection with the control unit, the radio node and the system of the first to third aspect.

A fifth aspect provides a computer-program product including computer executable instructions that, when executed by a processor perform the steps of the method according to the fifth aspect.

BRIEF DESCRIPTION OF THE DRAWINGS

The present invention is described by way of example with reference to the accompanying drawings. In the drawings.

DETAILED DESCRIPTION

Figure 1A:
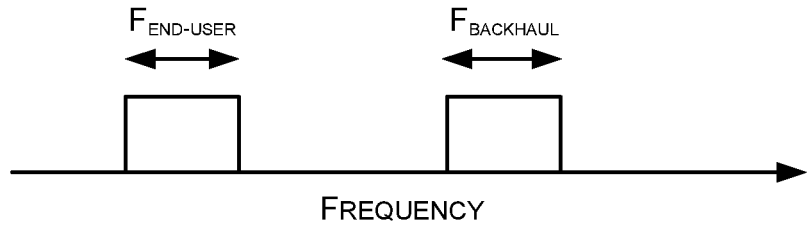
FIG. 1A is a schematic diagram of a known microwave backhauling system.
Figure 1A:
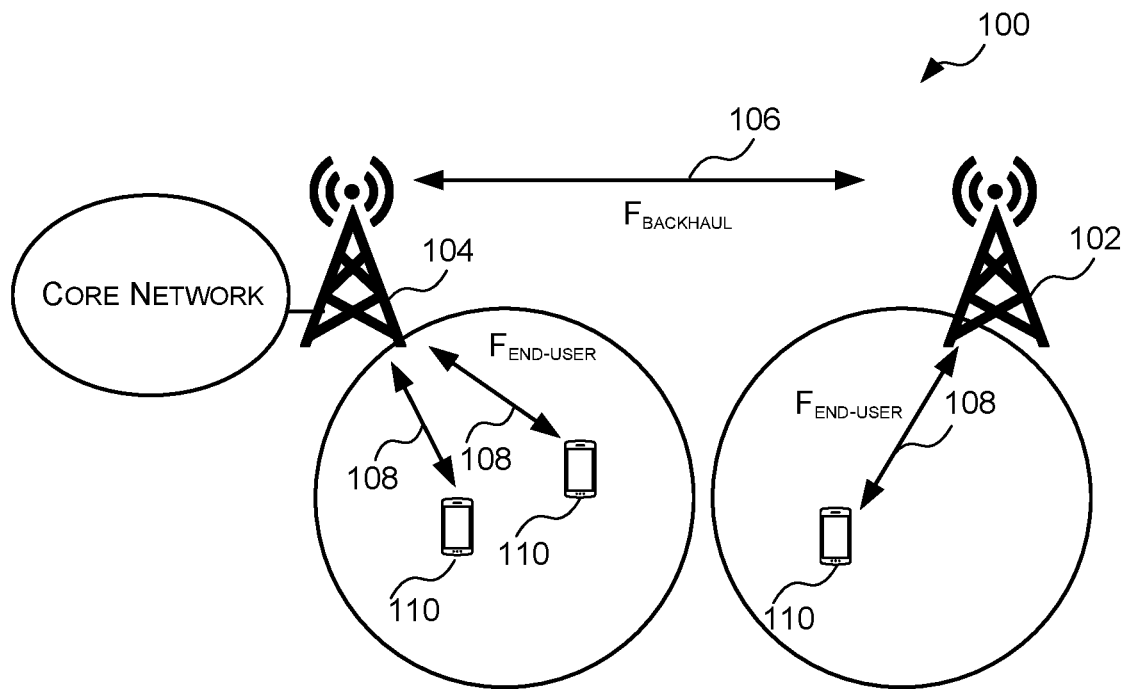

The following description is presented by way of example to enable a person skilled in the art to make and use various embodiments. The present invention is not limited to the embodiments described herein and various modifications to the disclosed embodiments will be apparent to those skilled in the art. Embodiments are described by way of example only.

Described herein are methods, systems and control units for controlling radio nodes, wherein radio nodes exchange backhaul information with at least one other radio node jointly over a first communication link established using a first frequency bandwidth ($F_{BACKHAUL}$); and a second communication link established using a second frequency bandwidth ($F_{END-USER}$) that is also used by the radio nodes to provide uplink and downlink radio access connectivity to one or more end-user nodes. Such methods, systems and control units enable high capacity backhaul links with a higher minimum guaranteed throughput compared to known microwave backhauling systems, such as the system 100 of FIG. 1A, which use a single point-to-point dedicated microwave backhaul link. Furthermore, since in the methods, systems and control units described herein the radio nodes only use two frequency bandwidths ($F_{BACKHAUL}$, $F_{END-USER}$) to provide uplink and downlink radio access connectivity to their respective end-user nodes and exchange backhaul information, they may be more efficient and less complex compared to systems, such as the system 120 of FIG. 1B, in which the radio nodes use three different frequency bandwidths ($F_{BACKHAUL}$, $F_{BACKHAUL2}$, $F_{END-USER}$) to provide uplink and downlink radio access connectivity to their respective end-user nodes and exchange backhaul information.

In some cases, the second communication link (i.e. the communication link established using the second frequency bandwidth) may be dynamically established based on the quality of the first communication link (i.e. the communication link established over the first frequency bandwidth). For example, in some cases the second communication link may be established when the quality of the first communication link falls below a minimum quality (e.g. when the throughput of backhaul information transmitted from a radio node to another radio node is below a first threshold and/or the throughput of the backhaul information received by the radio node from the other radio node is below a second threshold). When the second communication link is established the portion or amount of the second frequency bandwidth used to establish the second communication link may be dynamically adjusted based at least on the quality of the first communication link. This allows for efficient use of the frequency bandwidths as the second frequency bandwidth can be dedicated to providing uplink and downlink radio access connectivity when the first communication link is above a minimum quality and at least a portion of the second frequency bandwidth can be dynamically allocated for transporting backhaul information to supplement the first communication link when the quality of the first communication link falls below the minimum quality.

This makes the described methods, systems and control units suitable for scenarios where the end-user nodes spatial density and traffic intensity is positively correlated with the quality of the dedicated point-to-point backhaul link established using the first frequency bandwidth, such as outdoor scenarios affected by adverse meteorological conditions. In these cases, a large portion of the second frequency bandwidth can be used for transporting backhaul information to compensate for the capacity loss temporarily experienced over the first communication link during adverse meteorological conditions.

In some cases, either none (when the first communication link does meet a minimum quality threshold) or at least a portion of the second frequency bandwidth (when the first communication link does not meet a minimum quality threshold) may be allocated for use in establishing the second communication link (e.g. allocated for use in transporting backhaul information) by time partitioning radio access frames for the second frequency bandwidth into a plurality of epochs wherein the radio nodes perform one or more of the following in each epoch based on at least the quality of the first communication link: provide uplink radio access to end-user nodes using the second frequency bandwidth, provide downlink radio access to end-user nodes using the second frequency bandwidth, transmit backhaul information using the second frequency bandwidth, and receive backhaul information using the second frequency bandwidth. The duration of the epochs may be selected so as to find a balance between guaranteed uplink/downlink radio access connectivity throughput and backhaul throughput. The duration of the epochs may be selected or chosen within an infinite resolution interval or within a discrete set with a finite number of possibilities.

The term radio access frame is used herein to mean a time period in which a radio node transmits and/or receives signals over a certain frequency bandwidth. Accordingly, a radio access frame for the second frequency bandwidth is a time period in which a radio node transmits and/or receives signals over the second frequency bandwidth.

Figure 2:
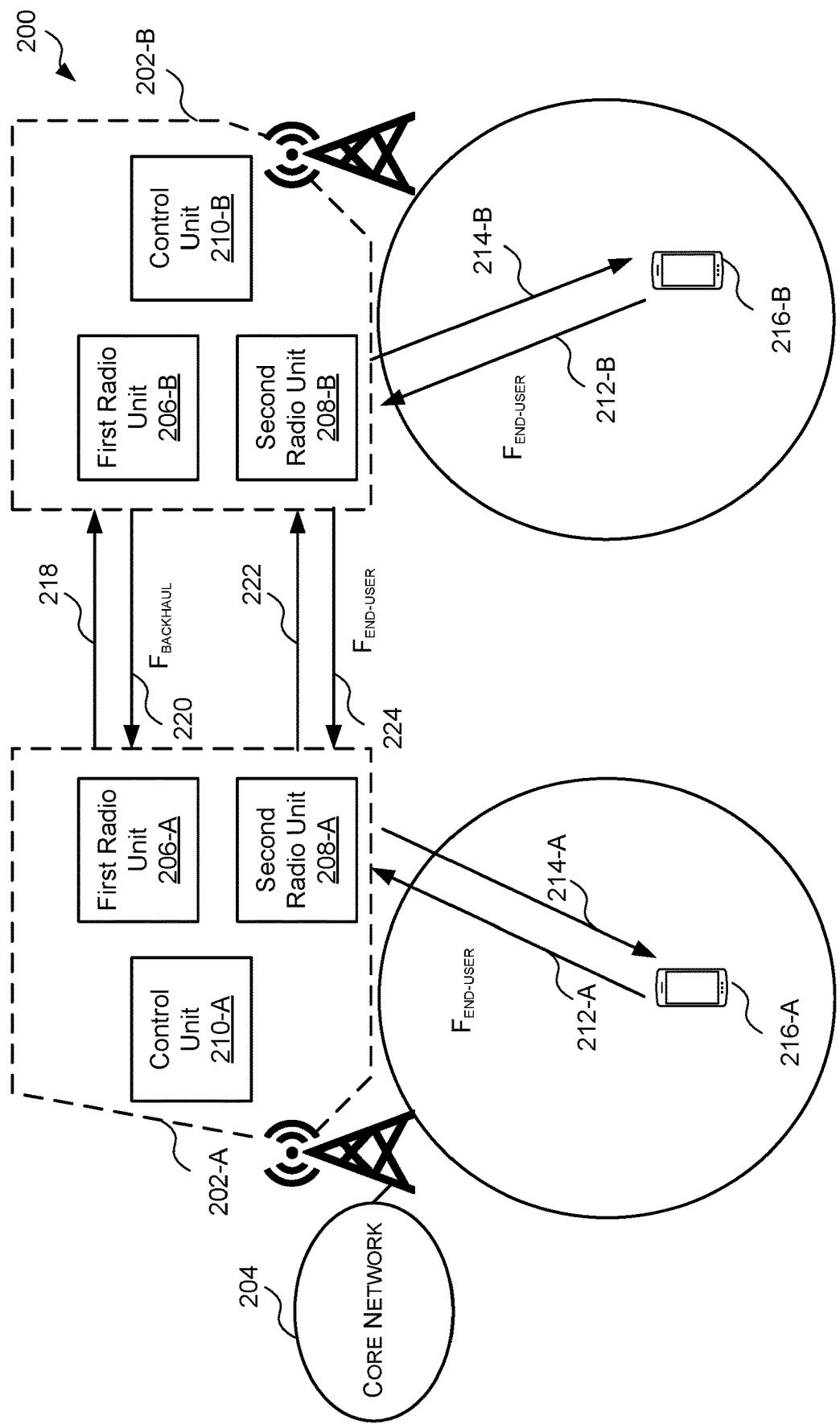
FIG. 2 is a schematic diagram of an example backhauling system that uses a combination of out-of-band backhauling and in-band backhauling.

Reference is now made to FIG. 2 which illustrates an example backhauling system 200 wherein backhaul information is exchanged between radio nodes jointly over a first communication link established using a first frequency bandwidth ($F_{BACKHAUL}$); and a second communication link established using a second frequency bandwidth ($F_{END\text{-}USER}$) that is also used by the radio nodes to provide uplink and downlink radio access connectivity to one or more end-user nodes.

The system 200 comprises a first radio node 202-A and a second radio node 202-B. The radio nodes 202-A, 202-B may be any device, such as, but not limited to, a base station or a wireless access point, that is capable of establishing radio communications with end-user nodes and with other radio nodes. The first radio node 202-A is connected to (or has access to) a core network 204 and as a result may be referred to as an anchor radio node. The first radio node 202-A may be connected to the core network 204 in any suitable manner, such as, but not limited to, via an optical fibre point of presence. The second radio node 202-B does not have a wired connection to the core network 204 and as a result may be referred to as a remote radio node. Since the second radio node 202-B is not connected to the core network 204 the second radio node exchanges backhaul information with the first radio node 202-A. The term "backhaul information" is used herein to mean information that is transmitted to/from the remote radio node from/to the core network and may include: communications to/from the anchor radio node (e.g. the first radio node 202-A) from/to the remote radio node (e.g. the second radio node 202-B); and communications to/from end-user nodes supported by the remote radio node (e.g. the second radio node 202-B) from/to other devices in the core network (e.g. end-user nodes supported by other radio nodes).

Each radio node 202-A, 202-B comprises a first radio unit 206-A, 206-B for transmitting and receiving information using a first frequency bandwidth ($F_{BACKHAUL}$), a second radio unit 208-A, 208-B for transmitting and receiving information using a second frequency bandwidth ($F_{END\text{-}USER}$) and a control unit 210-A, 210-B for controlling the operation of the radio node 202-A, 202-B and, in particular, for controlling the operation of the first and second radio units 206-A, 206-B, 208-A, 208-B. Since the first and second radio units are capable of transmitting and receiving radio signals, the first and second radio units 206-A, 206-B, 208-A, 208-B may be referred to as transceivers.

Figure 3:
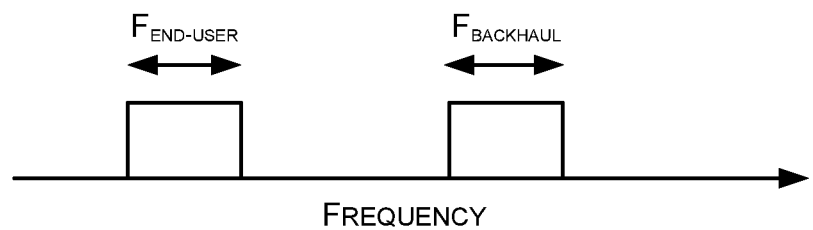
FIG. 3 is a schematic diagram of the frequency spectrum of the first and second frequency bandwidths.

The first and second frequency bandwidths ($F_{BACKHAUL}$, $F_{END\text{-}USER}$) are different (i.e. they are not identical). As shown in FIG. 3 the first and second frequency bandwidths may be disjoint (i.e. non-overlapping). However, in other examples, the first and second frequency bandwidths ($F_{BACKHAUL}$, $F_{END\text{-}USER}$) may be overlapping. In some cases, the first frequency bandwidth ($F_{BACKHAUL}$) may fall in any licensed or unlicensed region of the electromagnetic spectrum, such as, but not limited to, the 5150-5925 MHz frequency band, the V-band, the E-band, the W-band or the D-band; and the second frequency bandwidth ($F_{END\text{-}USER}$) may be in the region of 3400 MHz-3800 MHz or another frequency band, such as, but not limited to, an E-UTRA frequency allocation. As described in more detail below with reference to FIG. 10 each radio unit 206-A, 206-B, 208-A, 208-B may comprise, for example, a modem, an RF unit and one or more antennas. However, it will be evident to a person of skill in the art that this is an example only and that the radio units 206-A, 206-B, 208-A, 208-B may comprise additional and/or different components.

The control units 210-A, 210-B are configured to generate and output one or more control signals that cause the corresponding second radio unit 208-A, 208-B to provide uplink 212-A, 212-B and downlink 214-A, 214-B radio access connectivity to one or more end-user nodes 216-A, 216-B using the second frequency bandwidth ($F_{END\text{-}USER}$). Since the second frequency bandwidth is used to provide radio access connectivity to their respective end-user nodes it may be referred to as the end-user frequency bandwidth or the radio access bandwidth. The end-user nodes 216-A, 216-B may be any nomadic, fixed or mobile device capable of establishing a bidirectional wireless communication with the core network 204.

The control units 210-A, 210-B are also configured to generate one or more control signals that cause the corresponding first radio unit 206-A, 206-B to exchange a first portion of the backhaul information with the other radio node 202-B, 202-A over a first communication link 218, 220 established using the first frequency bandwidth ($F_{BACKHAUL}$), and that cause the corresponding second radio unit 208-A, 208-B to exchange a second portion of the backhaul information with the other radio node 202-B, 202-A over a second communication link 222, 224 using the second frequency bandwidth ($F_{END\text{-}USER}$).

Since the first communication link 218, 220 is established using a frequency bandwidth ($F_{BACKHAUL}$) dedicated to exchanging backhaul information the first communication link 218, 220 may also be referred to as a dedicated point-to-point radio backhaul link. Similarly, since the second communication link 222, 224 is established using the same frequency bandwidth ($F_{END\text{-}USER}$) that is used to provide uplink and downlink radio access connectivity to the end-user nodes, the second communication link 222, 224 may be referred to as an in-band radio backhaul link. As a result, in the example of FIG. 2 backhaul information is exchanged over both a dedicated point-to-point radio backhaul link (the first communication link 218, 220) and an in-band radio backhaul link (the second communication link 222, 224). Such a configuration allows the in-band radio backhaul link (i.e. the second communication link 222, 224)

to act as a complementary backhaul link to the dedicated point-to-point radio backhaul link (i.e. the first communication link 218, 220).

Figure 1B:
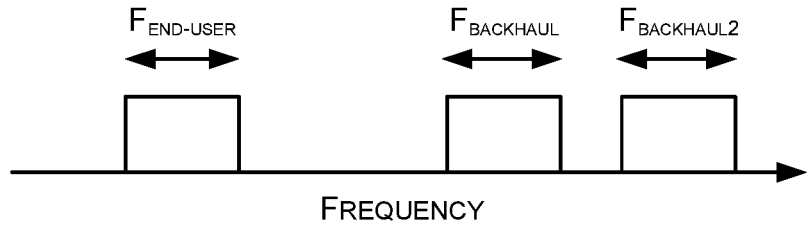
FIG. 1B is a schematic diagram of a known dual-band backhauling system.
Figure 1B:
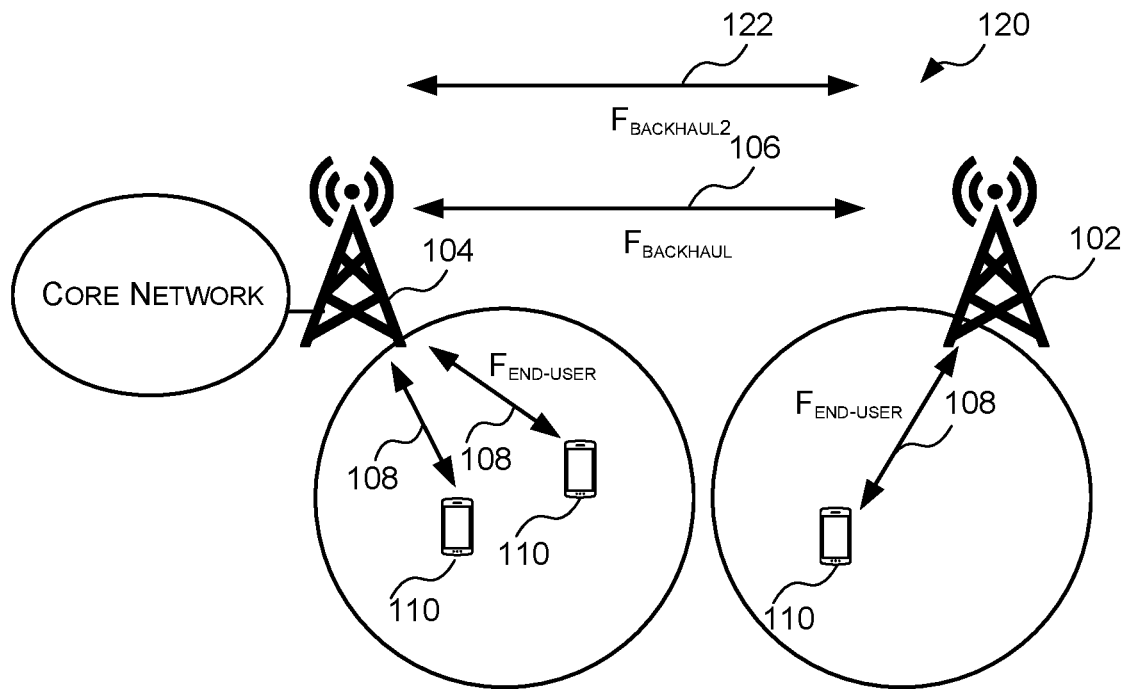

This allows the design constraints on the dedicated point-to-point radio backhaul link (e.g. the first communication link 218, 220) to be relaxed compared to systems, such as system 100 of FIG. 1A, which use only a single dedicated point-to-point radio backhaul link for exchanging backhaul information. For example, in a system, such as the system 100 of FIG. 1A, with a single dedicated point-to-point radio backhaul link, the single dedicated point-to-point radio backhaul link may be over-engineered so as to guarantee a minimum throughput for a certain percentage of time (e.g. the minimum throughput will be achieved 99.999% of the time—commonly referred to as a "five nines" guarantee). This means that the single dedicated point-to-point radio backhaul link may be over-engineered so that it can provide the guaranteed throughput even in conditions (e.g. certain weather conditions) that adversely affect the quality of the link. Using two backhaul links, the dedicated point-to-point radio backhaul link and the in-band backhaul link (i.e. the first and second communication links), together means that the same guaranteed minimum throughput for a certain percentage of time may be achieved, but with the dedicated point-to-point backhaul link itself providing a lower guaranteed throughput. This allows the dedicated point-to-point backhaul link to be implemented under less restrictions.

Alternatively, if the same constraints are placed on the dedicated point-to-point radio backhaul link (e.g. the first communication link 218, 220) to guarantee a minimum throughput for a certain percentage of time (e.g. 99.999%) then a higher guaranteed throughput for the same percentage of time (e.g. 99.999%) may be able to be achieved with the same dedicated point-to-point radio backhaul link as additional throughput is provided by the in-band backhaul link (e.g. the second communication link 222, 224).

Furthermore, since there are two backhaul links that have different or diverse characteristics the control units 210-A, 210-B may decide which backhaul information is sent over the first communication link 218, 220 and which backhaul information is sent over the second communication link 222, 224 based on the characteristics of the first and second communication links 218, 220, 222, 224. For example, the backhaul information may comprise a plurality of subsets of backhaul information wherein each subset is associated with a priority and the determination of which subset(s) are sent over the first communication link 218, 220 and which subset(s) are sent over the second communication link 222, 224 is based on the priorities associated with the subsets. For example, the higher priority subset(s) may be sent over the communication link that has lower latency.

The control units 210-A, 210-B of the first and second radio nodes 202-A, 202-B work in a synchronized manner to ensure, for example, that, when one control unit 210-A configures the corresponding second radio unit 208-A to establish the second communication link, the other control unit 210-B also configures the corresponding second radio unit 208-B to establish the second communication link. In some examples, as described with reference to FIG. 10, the radio nodes 202-A, 202-B, or the control units 210-A, 210-B, may comprise a synchronization unit that is configured to obtain synchronization information (e.g. Global Navigation Satellite System (GNSS) signals) to ensure that the radio nodes are time synchronized. In other examples the radio nodes 202-A, 202-B, or the control units 210-A, 210-B, may be synchronized through a distributed network synchronization protocol such as, but not limited to, the IEEE 1588 Precision Time Protocol.

In some cases, the control units 210-A, 210-B may be configured to dynamically adjust the amount or portion of the second frequency bandwidth ($F_{END-USER}$) that is used to establish the second communication link 222, 224 based, at least, on a determined quality of the first communication link 218, 220.

For example, the control units 210-A, 210-B may be configured to allocate none of the second frequency bandwidth ($F_{END-USER}$) for use in establishing the second communication link 222, 224 when the quality of the first communication link 218, 220 is equal to or greater than a minimum quality, and to allocate at least a portion of the second frequency bandwidth ($F_{END-USER}$) for use in establishing the second communication link 222, 224 when the quality of the first communication link 218, 220 is less than the minimum quality. In other words, in some cases, the control units 210-A, 210-B may be configured to cause the second communication link 222, 224 to be dynamically established if the quality of the first communication link 218, 220 is less than a minimum quality. This allows the second communication link 222, 224 to act as a backup to the first communication link 218, 220 wherein the second communication link 222, 224 is established when, for example, the first communication link 218, 220 cannot itself provide a certain throughput. This allows the second frequency bandwidth ($F_{END-USER}$) to be entirely dedicated to providing uplink 212-A, 212-B and downlink 214-A, 214-B radio access connectivity to the end-user nodes 216-A, 216-B when the second communication link is not needed.

If a control unit 210-A, 210-B determines that at least a portion of the second frequency bandwidth ($F_{END-USER}$) is to be allocated for use in establishing the second communication link 222, 224 then the control unit 210-A, 210-B may determine the amount or portion of the second frequency bandwidth ($F_{END-USER}$) to be used in establishing the second communication link 222, 224 (i.e. the amount of the second frequency bandwidth ($F_{END-USER}$) dedicated to exchanging backhaul information) based on one or more of: system requirements (e.g. target throughputs); the status or quality of the first communication link 218, 220; the status or quality of the second communication link 222, 224; and the status or quality of the end-user uplinks 212-A, 212-B and downlinks 214-A, 214-B. For example, the control units 210-A, 210-B may determine the amount or portion of the second frequency bandwidth ($F_{END-USER}$) to be used in establishing the second communication link 222, 224 based on one or more of:

A1) the instantaneous throughput of the backhaul information received by the first radio unit 206-A of the first radio node 202-A on the first communication link 220 ($Th_{B \to A}^{(1)}$);

A2) the instantaneous throughput of the backhaul information transmitted by the first radio unit 206-A of the first radio node 202-A over the first communication link 218 ($Th_{A \to B}^{(1)}$);

A3) the instantaneous spectral efficiency carried from the second radio unit 208-A of the first radio node 202-A over the second communication link 222;

A4) the instantaneous spectral efficiency carried from the second radio unit 208-B of the second radio node 202-B over the second communication link 224;

A5) the uplink and downlink spectral efficiencies provided by the first radio node 202-A to its end-user nodes 216-A;

A6) the uplink and downlink spectral efficiencies provided by the second radio node 202-B to its end-user nodes 216-B;
A7) statistics and characteristic parameters related to the first and second communications links 218, 220, 222, 224;
A8) statistics and characteristic parameters related to the uplink and downlink radio access connectivity of each radio node 202-A, 202-B to its end-user nodes 216-A, 216-B;
A9) interference levels affecting the radio nodes 202-A, 202-B and the end-user nodes 216-A, 216-B over the second frequency bandwidth ($F_{END\text{-}USER}$); and
A10) interference levels affecting the radio nodes 202-A, 202-B over the first frequency bandwidth ($F_{BACKHAUL}$).

As is known to those of skill in the art the spectral efficiency of a communication link is the information rate that can be transmitted over a given bandwidth. The link spectral efficiency is typically measured in bits/s/Hz. It is the net bit rate or maximum throughput divided by the bandwidth in Hz of a communication link.

The control units 210-A, 210-B may be configured to allocate none, a portion, or all of the second frequency bandwidth ($F_{END\text{-}USER}$) for establishing the second communication link 222, 224 by time partitioning radio access frames for the second frequency bandwidth ($F_{END\text{-}USER}$) into a plurality of epochs and by outputting one or more control signals to cause the corresponding second radio unit 208-A, 208-B to perform one or more of the following in each of the plurality of epochs based on at least the quality of the first communication link: provide uplink 212-A, 212-B radio access connectivity to one or more of its end-user nodes 216-A, 216-B using the second frequency bandwidth ($F_{END\text{-}USER}$); provide downlink 214-A, 214-B radio access connectivity to one or more of its end-user nodes 216-A, 216-B using the second frequency bandwidth ($F_{END\text{-}USER}$); transmit backhaul information to the other radio node 202-B, 202-A using the second frequency bandwidth ($F_{END\text{-}USER}$); and receive backhaul information from the other radio node 202-B, 202-A using the second frequency bandwidth ($F_{END\text{-}USER}$). Examples of how a radio access frame may be partitioned into a plurality of epochs will be described below with reference to FIGS. 5 to 8.

The term "epoch" is used herein to mean a period of time. Accordingly, time partitioning a radio access frame into a plurality of epochs comprises dividing the radio access frame into a plurality of smaller time periods. Dividing radio access frames for the second frequency bandwidth ($F_{END\text{-}USER}$) into a plurality of epochs and then controlling what action (uplink, downlink, backhaul transmit, backhaul receive) the second radio unit 208-A, 208-B performs via the second frequency bandwidth ($F_{END\text{-}USER}$) in each epoch controls how much of the second frequency bandwidth is allocated to each action (uplink, downlink, backhaul transmit, backhaul receive) and thus how much of the second frequency bandwidth is allocated for establishing the second communication link (i.e. for transmitting and receiving backhaul information).

As described in more detail below, the duration of the epochs determines or controls the radio access connectivity throughput and the backhaul throughput. In particular, the duration of the epochs determines or controls the uplink radio access connectivity throughput provided by the radio nodes to the end-user nodes, the downlink radio access connectivity throughput provided by the radio nodes to the end-user nodes, the transmit backhaul throughput and the receive backhaul throughput. Accordingly the control units 210-A, 210-B may be configured to select the duration of the epochs to maximize a function of one or more of: the total uplink radio access connectivity throughput provided by the remote radio node (e.g. the second radio node 202-B) to its end-user nodes; the total downlink radio access connectivity throughput provided to the end-user nodes by the remote radio node (e.g. the second radio node 202-B); the total throughput of backhaul information transmitted from the first radio node 202-A to the second radio node 202-B; and the total throughput of backhaul information transmitted from the second radio node 202-B to the first radio node 202-A. The maximization may be performed under one or more constraints to ensure a minimum throughput is provided for uplink/downlink access connectivity and/or backhaul information.

The control units 210-A, 210-B may be implemented in software or hardware. For example, one or more of the control units 210-A, 210-B may be a computing device that comprises one or more processors wherein the one or more processors are configured to generate and output the control signals to control the operation of the first and second radio units 206-A, 206-B, 208-A, 208-B. Specifically, in these examples the one or more processors may be configured to generate and output the control signals to cause the first and second radio units to exchange backhaul information with another radio unit and provide uplink and downlink radio access connectivity to one or more end-user nodes using the first and second frequency bandwidths ($F_{BACKHAUL}$ and $F_{END\text{-}USER}$) as described above. The one or more processors may also be configured to dynamically allocate none or a portion of the second frequency bandwidth ($F_{END\text{-}USER}$) for use in establishing the second communication link as described above. A processor may be any kind of general purpose or dedicated processor, such as a central processing unit (CPU), System-on-chip, state machine, media processor, an application-specific integrated circuit (ASIC), a programmable logic array, a field-programmable gate array (FPGA), or the like.

Although the system of FIG. 2 shows that each radio node 202-A, 202-B comprises a control unit 210-A, 210-B which controls the operation of that radio node (and specifically the operation of the first and second radio units of that radio node), in other examples, the control units 210-A, 210-B may not form part of the radio nodes 202-A, 202-B, but may be in communication with the radio nodes to control operation thereof. In yet other examples there may be a single control unit that is remote from, but in communication with, the radio nodes 202-A, 202-B and performs the functions of the two control units 210-A, 210-B to control operation of both radio nodes 202-A, 202-B. For example, a single control unit may generate control signals to control the operation of the first and second radio units 206-A, 206-B, 208-A, 208-B of both the first and second radio nodes 202-A, 202-B.

Although the system of FIG. 2 comprises only two radio nodes 202-A, 202-B it will be evident to a person of skill in the art that the methods, principles and techniques described herein may be applied to systems with more than two radio nodes each providing uplink and downlink radio access connectivity to their respective end-user nodes over a second frequency bandwidth ($F_{END\text{-}USER}$) and connected to one other node through a first communication link that is established using a first frequency bandwidth ($F_{BACKHAUL}$) wherein backhaul information is exchanged between that node and the other node over the first communication link and a second communication link established using the second frequency bandwidth ($F_{END\text{-}USER}$).

Although the system of FIG. 2 shows the first and second radio units 206-A, 208-A, 206-B, 208-B of a particular radio node 202-A, 202-B as being separate and distinct units, in other examples the functions that are performed by the first and second radio units 206-A, 208-A, 206-B, 208-B of a radio node 202-A, 202-B may be performed by a single radio unit of the radio node 202-A, 202-B that is capable of transmitting and receiving data over the first frequency bandwidth ($F_{BACKHAUL}$) and the second frequency bandwidth ($F_{END-USER}$).

Figure 4:
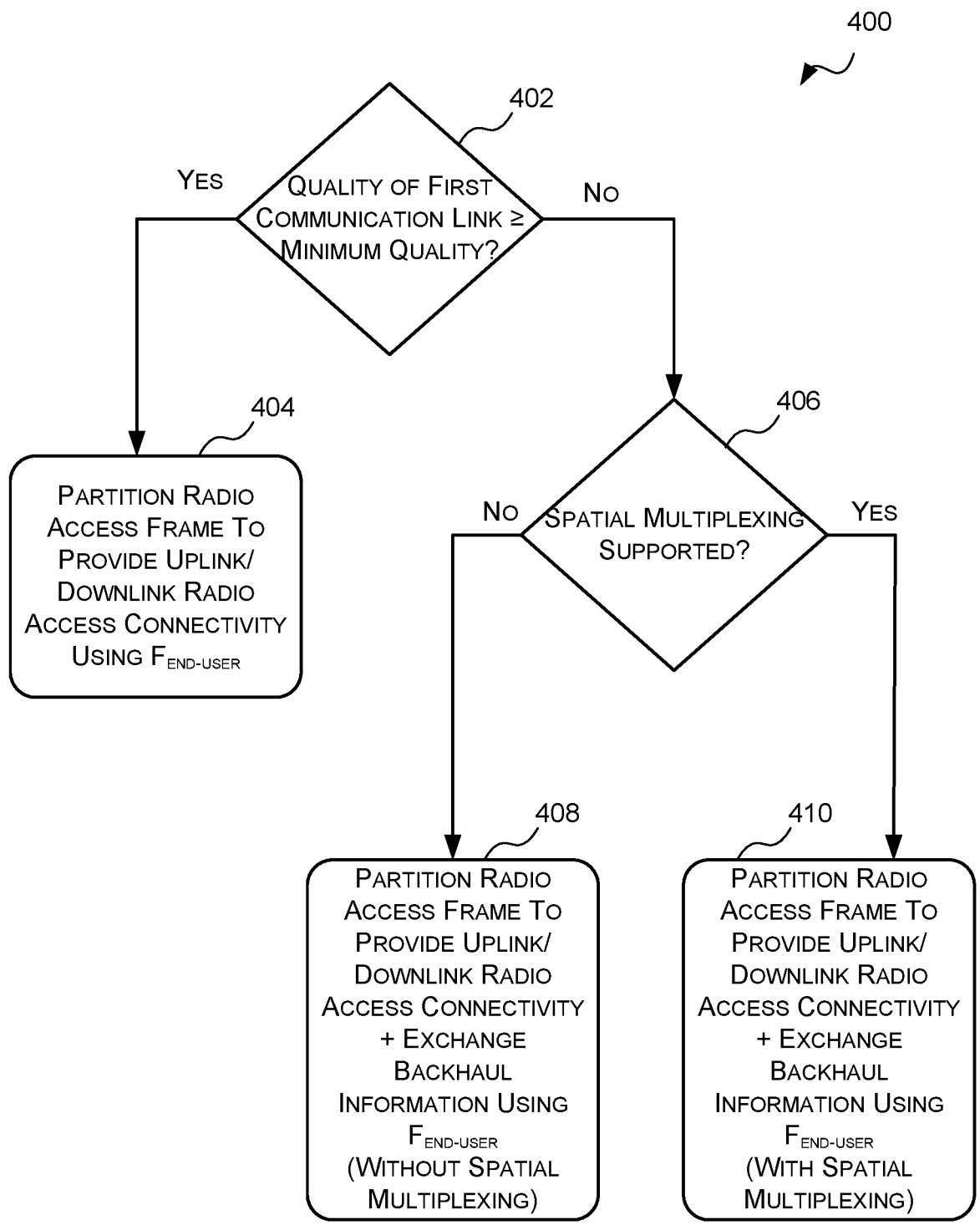
FIG. 4 is a flow diagram of an example method for dynamically allocating a portion of the second frequency bandwidth for establishing the second communication link.

Reference is now made to FIG. 4 which illustrates an example method 400 for dynamically allocating none or a portion of the second frequency bandwidth for use in establishing the second communication link. In other words, the example method 400 is for dynamically determining whether to establish the second communication link 222, 224, and if so, how much (or what portion) of the second frequency bandwidth ($F_{END-USER}$) is to be used to establish the second communication link (i.e. how much (or what portion) of the second frequency bandwidth ($F_{END-USER}$) is to be dedicated to exchanging backhaul information). The method 400 may be implemented by the control unit 210-A, 210-B.

The method 400 begins at block 402 where the control unit 210-A, 210-B determines whether the quality of the first communication link is greater than or equal to a minimum quality. In some cases, the control unit 210-A, 210-B may be configured to determine that the quality of the first communication link 218, 220 is greater than or equal to a minimum quality in response to determining that a throughput of backhaul information transmitted in one direction (e.g. the throughput of backhaul information transmitted from the first radio node 202-A over the first communication link 218 ($Th_{A \to B}^{(1)}$)) is greater than or equal to a first threshold ($\beta_1$) as shown in equation (1), and that a throughput of backhaul information transmitted in the other direction (e.g. the throughput of backhaul information received by the first radio node 202-A over the first communication link 220 ($Th_{B \to A}^{(1)}$)) is greater than or equal to a second threshold ($\beta_2$) as shown in equation (2):

$$Th_{A \to B}^{(1)} \geq \beta_1 \quad (1)$$

$$Th_{B \to A}^{(1)} \geq \beta_2 \quad (2)$$

In some cases, the first threshold ($\beta_1$) may be generated (e.g. by the control units 210-A, 210-B) to represent a function of the downlink spectral efficiencies provided by the second radio node 202-B (i.e. the remote radio node) over the second frequency bandwidth ($F_{END-USER}$) while the second threshold ($\beta_2$) may be generated (e.g. by the control units 210-A, 210-B) to represent a function of the uplink spectral efficiencies provided by the second radio node 202-B (i.e. the remote radio node) over the second frequency bandwidth ($F_{END-USER}$). The spectral efficiencies may be averaged over an arbitrary time basis and may be acquired either through direct measurement or synthetically computed from formulas that rely on knowledge of the uplinks and downlinks connecting the second radio node 202-B to its end-user nodes 216-B (e.g. A8) and statistics of the network interference levels (e.g. A9).

In some cases, the control unit 210-A, 210-B may be configured to directly measure the backhaul information throughputs over the first communication link 218, 220 ($Th_{A \to B}^{(1)}$, $Th_{B \to A}^{(1)}$) based on, for example, information from the first radio unit 206-A, 206-B. In other cases, the control unit 210-A, 210-B may be configured to obtain information (such as, but not limited to, statistics) on the backhaul information throughputs over the first communication link from another component or device in the system. It will be evident that this is an example only and that the control unit 210-A, 210-B may be configured to determine that the quality of the first communication link 218, 220 is less than a minimum quality in another manner.

If the control unit 210-A, 210-B determines at block 402 that the quality of the first communication link 218, 220 is greater than or equal to a minimum quality then the method 400 proceeds to block 404. If, however, the control unit 210-A, 210-B determines at block 402 that the quality of the first communication link 218, 220 is less than the minimum quality then the method 400 proceeds to block 406.

At block 404, since it has been determined that the quality of the first communication link is greater than or equal to a minimum quality, the backhaul information between the first and second radio nodes can be sufficiently exchanged using the first communication link only. Accordingly, the control unit 210-A, 210-B allocates none of the second frequency bandwidth ($F_{END-USER}$) to establishing the second communication link 222, 224. In other words, in this case the second communication link is not established. The control unit 210-A, 210-B then partitions the radio access frames for the second frequency bandwidth ($F_{END-USER}$) into a plurality of epochs to enable the radio nodes 202-A, 202-B to only provide uplink and downlink radio access connectivity to their respective end-user nodes 216-A, 216-B over the second frequency bandwidth ($F_{END-USER}$). For example, the control unit may partition the radio access frame to enable the radio nodes 202-A, 202-B to provide standard uplink and downlink operation. An example of how the radio access frame may be partitioned to enable the radio nodes 202-A, 202-B to provide uplink and downlink radio access connectivity to the end-user nodes using the second frequency bandwidth ($F_{END-USER}$) will be described below with reference to FIG. 5. Once the radio access frame for the second frequency bandwidth ($F_{END-USER}$) has been partitioned the method 400 ends.

At block 406, since it has been determined that the quality of the first communication link is less than the minimum quality, the backhaul information cannot be sufficiently exchanged over the first communication link alone thus at least a portion of the second frequency bandwidth is allocated to establish the second communication link. To allocate a portion of the second frequency bandwidth for establishing the second communication link the radio access frame is partitioned into a plurality of epochs so that the radio nodes use the second frequency bandwidth to both provide uplink and downlink connectivity access to end-user nodes and exchange backhaul information. To determine how to partition the radio access frames the control unit 210-A, 210-B determines whether the second radio unit 208-A, 208-B supports spatial multiplexing. This is because the frame can be partitioned in a different manner if the second radio unit supports spatial multiplexing. As is known to those of skill in the art, spatial multiplexing (SM) is a transmission technique in multiple-input-multiple-output (MIMO) wireless systems used to transmit independent and separately encoded data signal (which may be referred to as streams) from multiple transmit antennas simultaneously or in parallel using a known spatial multiplexing technique.

If it is determined at block 406 that the second radio unit 208-A, 208-B does not support spatial multiplexing then the method 400 proceeds to block 408. If, however, it is determined at block 406 that the second radio unit does support spatial multiplexing then the method 400 proceeds to block 410.

At block 408, the control unit 210-A, 210-B time partitions the radio access frames for the second frequency bandwidth ($F_{END-USER}$) into a plurality of epochs to enable the radio nodes to provide uplink and downlink radio access connectivity to their respective end-user nodes and exchange backhaul information over the second frequency bandwidth ($F_{END-USER}$) without using spatial multiplexing techniques. An example of how the radio access frame for the second frequency bandwidth ($F_{END-USER}$) may be partitioned to enable the radio nodes 202-A, 202-B to provide uplink and downlink radio access connectivity to the end-user nodes and exchange backhaul information over the second frequency bandwidth ($F_{END-USER}$) without spatial multiplexing is described below with reference to FIG. 6. Once the radio access frame for the second frequency bandwidth ($F_{END-USER}$) has been partitioned the method 400 ends.

At block 410, the control unit 210-A, 210-B time partitions the radio access frames over the second frequency bandwidth ($F_{END-USER}$) into a plurality of epochs to enable the radio nodes 202-A, 202-B to provide uplink and downlink radio access connectivity to their respective end-user nodes and exchange backhaul information over the second frequency bandwidth ($F_{END-USER}$) using spatial multiplexing techniques. Examples of how the radio access frame for the second frequency bandwidth ($F_{END-USER}$) may be partitioned to enable the radio nodes 202-A, 202-B to provide uplink and downlink radio access connectivity to the end-user nodes and exchange backhaul information using the second frequency bandwidth ($F_{END-USER}$) with spatial multiplexing techniques are described below with reference to FIGS. 7 and 8. Once the radio access frame for the second frequency bandwidth ($F_{END-USER}$) has been partitioned the method 400 ends.

When the second frequency bandwidth ($F_{END-USER}$) is operated in a Time Division Duplexing (TDD) mode (i.e. when transmissions and receptions over the second frequency bandwidth ($F_{END-USER}$) at a given radio node occur over different time slots in the same frequency bandwidth) the method can be as described above. However, when the second frequency bandwidth ($F_{END-USER}$) is operated in a Frequency Division Duplexing (FDD) mode (i.e. when transmissions and receptions at a given radio node occur over different frequency allocations within the second frequency bandwidth ($F_{END-USER}$)) the method may comprise, in addition to allocating time resources (via different epochs) to provide uplink and downlink radio access connectivity and exchange backhaul information over the second frequency bandwidth ($F_{END-USER}$), allocating frequency resources from the second frequency bandwidth to provide uplink and downlink radio access connectivity and exchange backhaul information.

In some cases, the control units 210-A, 210-B may be configured to execute method 400 periodically. For example, in some cases the control units 210-A, 210-B may be configured to execute method 400 after a predetermined number (e.g. N where N is an integer greater than or equal to two) of radio access frames.

Figure 5:
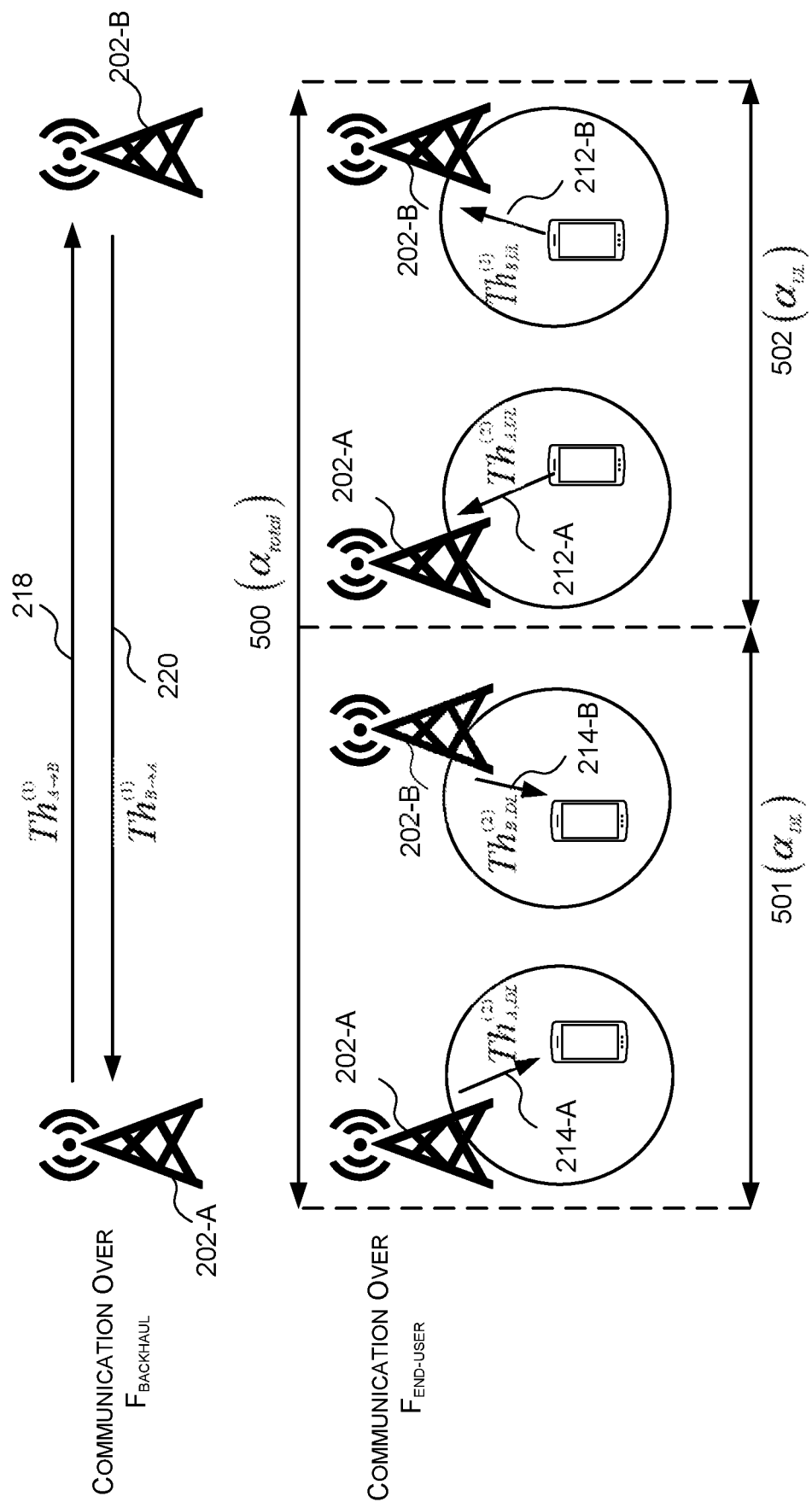
FIG. 5 is a schematic diagram illustrating an example of a radio access frame time-partitioned to enable a pair of radio nodes to provide uplink and downlink radio access connectivity to their respective end-user nodes using the second frequency bandwidth.

Reference is now made to FIG. 5 which illustrates an example of how the radio access frame for the second frequency bandwidth ($F_{END-USER}$) is partitioned (e.g. in block 404 of method 400 of FIG. 4) into a plurality of epochs to only provide uplink and downlink radio access connectivity to the end-user nodes over the second frequency bandwidth ($F_{END-USER}$).

Since the second frequency bandwidth is only used to provide uplink and downlink radio access, the total throughput of backhaul information transmitted from the first radio node 202-A to the second radio node 202-B ($TBH_{A \to B}$) is equal to the throughput of backhaul information transmitted from the first radio node 202-A to the second radio node 202-B over the first communication link ($Th_{A \to B}^{(1)}$) as shown in equation (3) and the total throughput of backhaul information received by the first radio node 202-A from the second radio node 202-B ($TBH_{B \to A}$) is equal to the throughput of backhaul information received by the first radio node 202-A from the second radio node 202-B over the first communication link ($Th_{B \to A}^{(1)}$) as shown in equation (4):

$$TBH_{A \to B} = Th_{A \to B}^{(1)} \quad (3)$$

$$TBH_{B \to A} = Th_{B \to A}^{(1)} \quad (4)$$

Time partitioning the radio access frame for the second frequency bandwidth into a plurality of epochs to enable the radio nodes 202-A, 202-B to only provide uplink and downlink radio access connectivity to the end-user nodes over the second frequency bandwidth ($F_{END-USER}$) may comprise the control unit time partitioning the radio access frame 500 for the second frequency bandwidth ($F_{END-USER}$) into two epochs 501, 502. The control unit 210-A, 210-B then causes the corresponding second radio unit 208-A, 208-B to provide downlink 214-A, 214-B radio access connectivity to its end-user nodes in one epoch 501 ($\alpha_{DL}$) (which may be referred to as the downlink epoch); and provide uplink 212-A, 212-B radio access connectivity to its end-user nodes in the other epoch 502 ($\alpha_{UL}$) (which may be referred to as the uplink epoch). The durations of the epochs 501, 502 ($\alpha_{DL}$, $\alpha_{UL}$) may be selected by the control units 210-A, 210-B to reflect the downlink and uplink imbalance that is imposed by the radio access protocol implemented by the radio node. Although FIG. 5 illustrates that the whole frame duration (a falls into one epoch or the other (i.e. $\alpha_{total} = \alpha_{DL} + \alpha_{UL}$), in other cases guard periods may be inserted between the epochs wherein neither uplink nor downlink radio access connectivity is provided to the end-user nodes.

Figure 6:
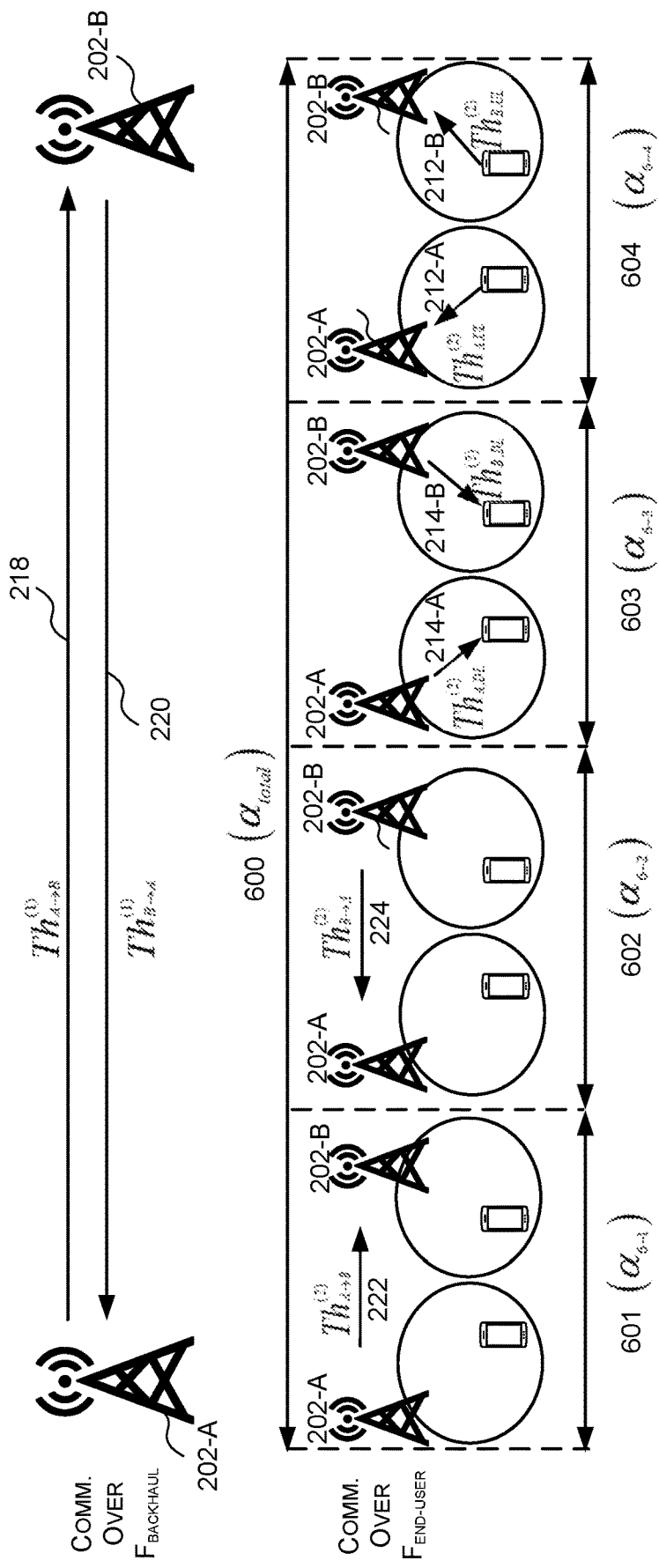
FIG. 6 is a schematic diagram illustrating an example of a radio access frame time-partitioned to enable a pair of radio nodes to provide uplink and downlink radio access connectivity to their respective end-user nodes using the second frequency bandwidth and exchange backhaul information using the second frequency bandwidth without spatial multiplexing.

Reference is now made to FIG. 6 which illustrates an example of a how a radio access frame for the second frequency bandwidth ($F_{END-USER}$) is time partitioned into a plurality of epochs to enable the radio nodes 202-A, 202-B to provide uplink and downlink radio access connectivity to the end-user nodes and exchange backhaul information over the second frequency bandwidth ($F_{END-USER}$) without spatial multiplexing techniques being supported by the radio nodes 202-A, 202-B (e.g. in block 408 of method 400 of FIG. 4).

Since the first communication link 218, 220 is not sufficient to meet the backhaul information needs, at least a portion of the second frequency bandwidth ($F_{END-USER}$) is allocated for establishing the second communication link 222, 224 so that a first portion of the backhaul information is exchanged via the first communication link 218, 220 over the first frequency bandwidth and a second portion of the backhaul information is exchanged via the second communication link 222, 224 over the second frequency bandwidth. The first portion of the backhaul information may correspond to the amount of backhaul information that can be reliably carried over the first communication link using the first frequency bandwidth and the second part of the backhaul information may correspond to the amount of backhaul information that can be reliably carried over the second communication link using the second frequency bandwidth.

To enable transmission and receipt of backhaul information over the second frequency bandwidth the radio frame is divided into more epochs than in the example shown in FIG.

5. In some embodiments, there must be at least two additional epochs to allow the second radio unit 208-A, 208-B to transmit and receive backhaul information using the second frequency bandwidth in addition to providing uplink and downlink radio access connectivity to its one or more end-user nodes.

In one example, the control unit 210-A, 210-B may be configured to partition the radio access frames for the second frequency bandwidth ($F_{END-USER}$) into a plurality of epochs to enable the radio nodes 202-A, 202-B to provide uplink and downlink radio access connectivity to their respective end-user nodes and exchange backhaul information over the second frequency bandwidth ($F_{END-USER}$) by time partitioning the radio access frame 600 for the second frequency bandwidth ($F_{END-USER}$) into four epochs 601, 602, 603, 604 ($\alpha_{6-1}$, $\alpha_{6-2}$, $\alpha_{6-3}$, $\alpha_{6-4}$). The control units 210-A, 210-B then cause the corresponding second radio unit 208-A, 208-B to:

transmit backhaul information to the other radio node over the second frequency bandwidth ($F_{END-USER}$) in one epoch 601 ($\alpha_{6-1}$) (for the first radio node 202-A)/ 602 ($\alpha_{6-2}$) (for the second radio node 202-B) (which may be referred to as the backhaul transmit epoch, with respect to the first radio node 202-A);

receive backhaul information from the other radio node over the second frequency bandwidth in another epoch 602 ($\alpha_{6-2}$) (for the first radio node)/601 ($\alpha_{6-1}$) (for the second radio node) (which may be referred to as the backhaul receive epoch, with respect to the first radio node 202-A);

provide downlink radio access connectivity to its end-user nodes during yet another epoch 603 ($\alpha_{6-3}$) (which may be referred to as the downlink epoch); and provide uplink radio access connectivity to its end-user nodes during the final epoch 604 ($\alpha_{6-4}$) (which may be referred to as the uplink epoch).

Although the epochs are shown in a particular order—e.g. the backhaul transmit epoch is the first epoch, the backhaul receive epoch is the second epoch, the downlink epoch is the third epoch and the uplink epoch is the fourth epoch—it will be evident to a person of skill in the art that the different epochs may be implemented in a different order in the radio frame. For example, in another example, the downlink epoch may be the first epoch, the uplink epoch the second epoch, the backhaul receive epoch the third epoch and the backhaul transmit epoch the fourth epoch.

In this example, the total throughput of backhaul information transmitted from the first radio node 202-A to the second radio node 202-B ($TBH_{A \rightarrow B}$) is equal to the sum of the throughput of backhaul information transmitted from the first radio node 202-A to the second radio node 202-B over the first communication link ($Th_{A \rightarrow B}^{(1)}$) and the throughput of backhaul information transmitted from the first radio node 202-A to the second radio node 202-B over the second communication link ($Th_{A \rightarrow B}^{(2)}$) as shown in equation (5); and the total throughput of backhaul information received by the first radio node 202-A from the second radio node 202-B ($TBH_{B \rightarrow A}$) is equal to the sum of the throughput of backhaul information received by the first radio node 202-A from the second radio node 202-B over the first communication link ($Th_{B \rightarrow A}^{(1)}$) and the throughput of the backhaul information received by the first radio node 202-A from the second radio node 202-B over the second communication link ($Th_{B \rightarrow A}^{(2)}$) as shown in equation (6):

$$TBH_{A \rightarrow B} = Th_{A \rightarrow B}^{(1)} + Th_{A \rightarrow B}^{(2)} \qquad (5)$$

$$TBH_{B \rightarrow A} = Th_{B \rightarrow A}^{(1)} + Th_{B \rightarrow A}^{(2)} \qquad (6)$$

The control units 210-A, 210-B may be configured to select the duration of the epochs 601, 602, 603, 604 ($\alpha_{6-1}$, $\alpha_{6-2}$, $\alpha_{6-3}$, $\alpha_{6-4}$) so as to maximize or optimize a function of one or more of: the total uplink radio access connectivity throughput provided by the remote radio node (e.g. the second radio node 202-B) to its end-user nodes ($Th_{B,UL}^{(2)}$); the total downlink radio access connectivity throughput provided to the end-user nodes by the remote radio node (e.g. the second radio node 202-B) ($Th_{B,DL}^{(2)}$); the total throughput of backhaul information transmitted from the first radio node 202-A to the second radio node 202-B ($TBH_{A \rightarrow B}$); and the total throughput of backhaul information transmitted from the second radio node 202-B to the first radio node 202-A ($TBH_{B \rightarrow A}$). Such a function is illustrated in equation (7):

$$f(Th_{B,UL}^{(2)}, Th_{B,DL}^{(2)}, TBH_{A \rightarrow B}, TBH_{B \rightarrow A}) \qquad (7)$$

As is known to those of skill in the art, maximizing a function of one or more variables comprises identifying the values of the one or more variables which result in a maximum value of the function. In other words, the control units 210-A, 210-B may be configured to select the duration of the epochs 601, 602, 603, 604 that generates a maximum value of a function of one or more of the above-noted variables (e.g. $Th_{B,UL}^{(2)}$, $Th_{B,DL}^{(2)}$, $TBH_{A \rightarrow B}$, $TBH_{B \rightarrow A}$). The set of values for the one or more variables which result in a maximum value of the function may be referred to as the optimal solution. The control units 210-A, 210-B may be configured to maximize the function using any known methods for maximizing or optimizing a function such as, but not limited to, systematically choosing values for the one or more variables from an allowed set, computing the value of the function, and then selecting the values for the one or more variables that produce the maximum value of the function.

The maximization may be subjected to one or more constraints (which is referred to as constrained maximization or optimization). For example, the maximization may be under the constraint that the total uplink and downlink radio access connectivity throughputs provided by the remote radio node (e.g. the second radio node 202-B) to its end-user nodes ($Th_{B,UL}^{(2)}$, $Th_{B,DL}^{(2)}$) can be backhauled over the first and second communication links 218, 220, 222, 224. For example, the maximization may be under the constraint that the total throughput of backhaul information transmitted from the first radio node 202-A to the second radio node 202-B ($TBH_{A \rightarrow B}$) is greater than or equal to the total downlink radio access connectivity throughput provided by the second radio node 202-B to its end-user nodes ($Th_{B,DL}^{(2)}$) as shown in equation (8); and/or the constraint that the total throughput of backhaul information transmitted from the second radio node 202-B to the first radio node 202-A ($TBH_{B \rightarrow A}$) is greater than or equal to the total uplink radio access connectivity throughput provided by the second radio node 202-B to its end-user nodes ($Th_{B,UL}^{(2)}$) as shown in equation (9):

$$TBH_{A \rightarrow B} \geq Th_{B,DL}^{(2)} \qquad (8)$$

$$TBH_{B \rightarrow A} \geq Th_{B,UL}^{(2)} \qquad (9)$$

The maximization may also, or alternatively, be under the constraint that the uplink and/or downlink throughput provided by the remote radio node (e.g. the second radio node 202-B) to its end-user nodes 216-B does not fall below a predetermined threshold (which may be the same or different for the uplink and downlink throughputs). For example, the maximization may be under the constraint that the total uplink radio access connectivity throughput provided by the remote radio node (e.g. the second radio node 202-B) to its end-user nodes 216-B ($Th_{B,UL}^{(2)}$) is greater than or equal to a predetermined threshold ($\gamma_1$) as shown in equation (10); and/or the constraint that the total downlink radio access connectivity throughput provided by the remote radio node (e.g. the second radio node 202-B) to its end-user nodes 216-B ($Th_{B,DL}^{(2)}$) is greater than or equal to a threshold ($\gamma_2$) as shown in equation (11):

$$Th_{B,UL}^{(2)} \geq \gamma_1 \qquad (10)$$

$$Th_{B,DL}^{(2)} \geq \gamma_2 \qquad (11)$$

The maximization may also, or alternatively, be under the constraint that the uplink and/or downlink throughput provided by the anchor radio node (e.g. the first radio node 202-A) to its end-user nodes 216-A does not fall below a predetermined threshold (which may be the same or different for the uplink and downlink throughputs). For example, the maximization may be under the constraint that the total uplink radio access connectivity throughput provided by the first radio node 202-A to its end-user nodes 216-A ($Th_{A,UL}^{(2)}$) is greater than or equal to a pre-determined threshold ($\gamma_3$) as shown in equation (12); and/or the constraint that the total downlink radio access connectivity throughput provided by the first radio node 202-A to its end-user nodes 216-A ($Th_{A,DL}^{(2)}$) is greater than or equal to a threshold ($\gamma_4$) as shown in equation (13):

$$Th_{A,UL}^{(2)} \geq \gamma_3 \qquad (12)$$

$$Th_{A,DL}^{(2)} \geq \gamma_4 \qquad (13)$$

The maximization may also, or alternatively, be under the constraint that the combined duration of the four disjointed epochs 601, 602, 603, 604 ($\alpha_{6-1}$, $\alpha_{6-2}$, $\alpha_{6-3}$, $\alpha_{6-4}$) is equal to the total duration ($\alpha_{total}$) of the radio access frame for the second frequency bandwidth ($F_{END-USER}$) as shown in equation (14):

$$\alpha_{total} = \alpha_{6-1} + \alpha_{6-2} + \alpha_{6-3} + \alpha_{6-4} \qquad (14)$$

The thresholds $\gamma_1$, $\gamma_2$, $\gamma_3$, $\gamma_4$ are generally based on a minimum quality of service rate to be achieved for the end-user nodes. The thresholds $\gamma_1$, $\gamma_2$ related to the radio access connectivity provided by the remote radio node (e.g. the second radio node 202-B) may be a function of the uplink and/or downlink overall access spectral efficiencies provided by the second radio node 202-B during standard network operation over the second frequency bandwidth ($F_{END-USER}$). The thresholds $\gamma_3$, $\gamma_4$ related to the radio access connectivity provided by the anchor radio node (e.g. the first radio node 202-A) may be a function of the uplink and/or downlink overall access spectral efficiencies provided by the first radio node 202-A during standard network operation over the second frequency bandwidth ($F_{END-USER}$). The thresholds $\gamma_1$, $\gamma_2$, $\gamma_3$, $\gamma_4$ may be predefined (e.g. fixed) or they may be dynamically adjusted. The thresholds $\gamma_1$, $\gamma_2$, $\gamma_3$, $\gamma_4$ may be manually provided to the control units 210-A, 210-B, for example by a user or administrator, or they may be hard-coded into the control units 210-A, 210-B.

The uplink, downlink, and backhaul throughputs ($Th_{A,UL}^{(2)}$, $Th_{A,DL}^{(2)}$, $Th_{B,UL}^{(2)}$, $Th_{B,DL}^{(2)}$, $TBH_{A \rightarrow B}$, $TBH_{B \rightarrow A}$) achieved will depend on the duration of the epochs and may be determined or estimated from direct measurements of the system spectral efficiencies and/or throughputs (e.g. A1, A2, A3, A4, A5 and A6) or may be determined or estimated from known formulas that are based on knowledge of the communication links connecting the radio nodes (e.g. A7), the communication channels between the radio nodes 202-A, 202-B and the end-user nodes 216-A, 216-B (e.g. A8), and statistics of the interference levels experienced by the radio nodes and the end-user nodes (e.g. A9 and A10).

The function that is maximized may be any linear or non-linear function based on the input variables (e.g. the total uplink radio access connectivity throughput provided by the remote radio node (e.g. the second radio node 202-B) to its end-user nodes; the total downlink radio access connectivity throughput provided to the end-user nodes by the remote radio node (e.g. the second radio node 202-B); the total throughput of backhaul information transmitted from the first radio node 202-A to the second radio node; and the total throughput of backhaul information transmitted from the second radio node to the first radio node 202-A). For example, the function that is maximized may be a weighted linear combination of the uplink and downlink radio access connectivity throughputs that are provided by the remote radio node (e.g. the second radio node 202-B) ($Th_{B,UL}^{(2)}$, $Th_{B,DL}^{(2)}$). In another example, the function that is maximized may be a weighted linear combination of the overall backhaul information throughput from the first radio node 202-A to the second radio node 202-B ($TBH_{A \rightarrow B}$) and the overall backhaul information throughput from the second radio node 202-B to the first radio node 202-A ($TBH_{B \rightarrow A}$). In yet another example, the function that is maximized is a weighted linear combination of the uplink radio access connectivity throughput provided by the remote radio node (e.g. the second radio node 202-B) ($Th_{B,UL}^{(2)}$), the downlink radio access connectivity throughput provided by the remote radio node (e.g. the second radio node 202-B) ($Th_{B,DL}^{(2)}$), the overall backhaul information throughput from the first radio node 202-A to the second radio node 202-B ($TBH_{A \rightarrow B}$) and the overall backhaul information throughput from the second radio node 202-B to the first radio node 202-A ($TBH_{B \rightarrow A}$). However, it will be evident to a person of skill in the art that this is an example only and that other functions may be used to determine the duration of the epochs.

Figure 7:
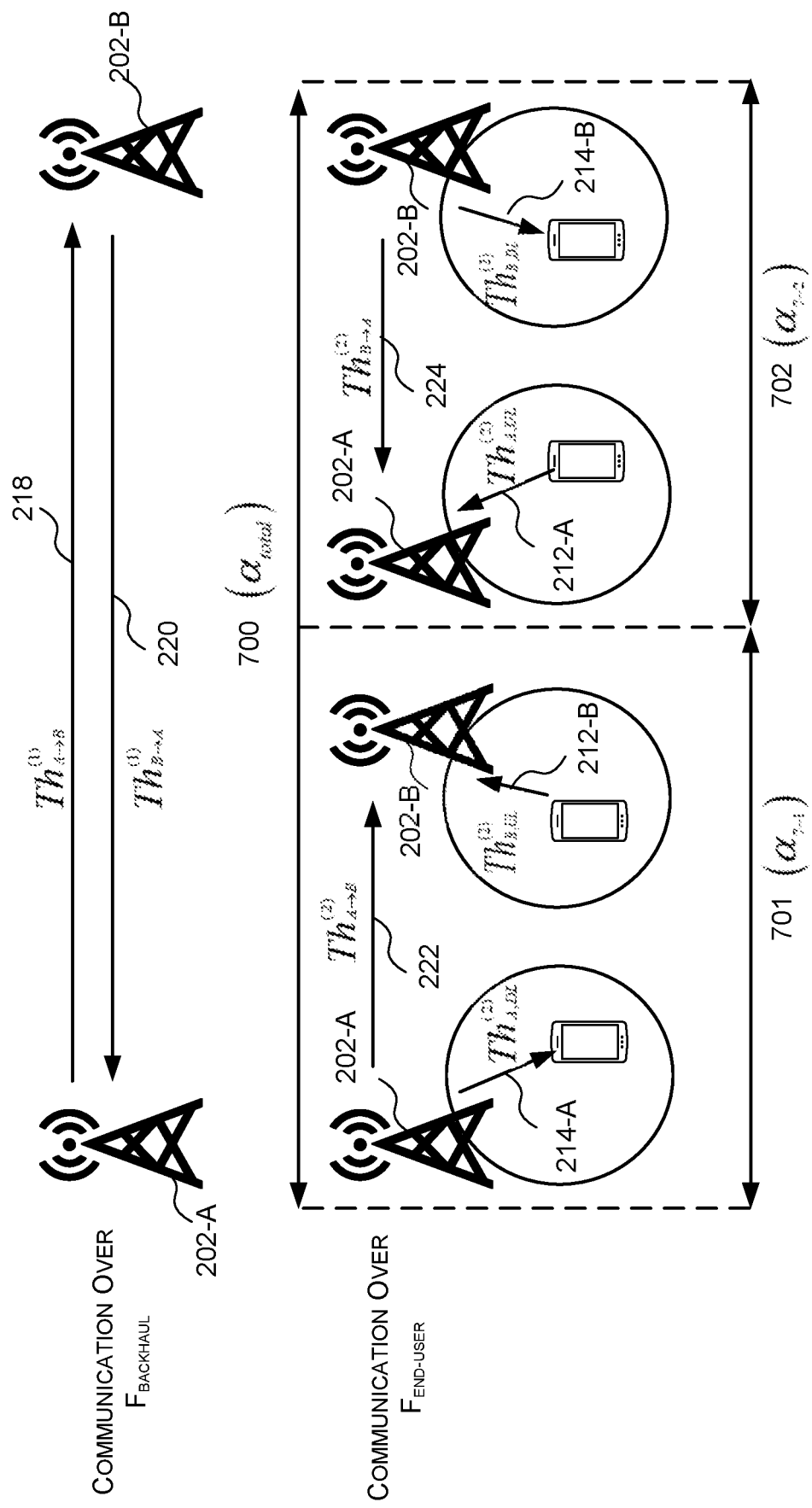
FIG. 7 is a schematic diagram illustrating a first example of a radio access frame time-partitioned to enable a pair of radio nodes to provide uplink and downlink radio access connectivity to their respective end-user nodes using the second frequency bandwidth and exchange backhaul information using the second frequency bandwidth with spatial multiplexing.

Reference is now made to FIG. 7 which illustrates a first example of how a radio access frame for the second frequency bandwidth ($F_{END-USER}$) may be time partitioned into a plurality of epochs to enable the radio nodes 202-A, 202-B to provide uplink and downlink radio access connectivity to their respective end-user nodes and exchange backhaul information over the second frequency bandwidth ($F_{END-USER}$) when spatial multiplexing techniques are supported by the radio nodes 202-A, 202-B (e.g. in block 410 of the method 400 of FIG. 4).

As described above, in this case the first communication link 218, 220 is not sufficient to meet the backhaul information needs and so at least a portion of the second frequency bandwidth ($F_{END-USER}$) is allocated for establishing the second communication link 222, 224 so that a first portion of the backhaul information is exchanged via the first communication link using the first frequency bandwidth and a second portion of the backhaul information is exchanged via the second communication link using the second frequency bandwidth. The first portion of the backhaul information may correspond to the amount of backhaul information that can be reliably carried over the first communication link using the first frequency bandwidth and the second portion of the backhaul information may correspond to the amount of backhaul information that can be reliably carried over the second communication link using the second frequency bandwidth.

Since the second radio units 208-A, 208-B support spatial multiplexing, the second radio units can concurrently or simultaneously receive two or more different information streams over the second frequency bandwidth, and/or concurrently transmit two or more different information streams over the second frequency bandwidth. This allows each second radio unit 208-A, 208-B to concurrently provide uplink radio access connectivity to its end-user nodes using the second frequency bandwidth ($F_{END\text{-}USER}$) and receive backhaul information from the other radio node using the second frequency bandwidth ($F_{END\text{-}USER}$); and/or concurrently provide downlink radio access connectivity to its end-user nodes using the second frequency bandwidth ($F_{END\text{-}USER}$) and transmit backhaul information to the other radio node using the second frequency bandwidth ($F_{END\text{-}USER}$).

Accordingly, where the second radio units 208-A, 208-B support spatial multiplexing, the control units 210-A, 210-B may be configured to divide the radio access frame 700 for the second frequency bandwidth ($F_{END\text{-}USER}$) into at least two epochs 701, 702 ($\alpha_{7\text{-}1}$, $\alpha_{7\text{-}2}$). The control units 210-A, 210-B then cause their corresponding second radio unit 208-A, 208-B to:

concurrently provide downlink radio access connectivity to its end-user nodes 216-A, 216-B over the second frequency bandwidth and transmit backhaul information to the other radio node 202-B, 202-A using the second frequency bandwidth in one epoch—this is the first epoch 701 ($\alpha_{7\text{-}1}$) for the first radio node 202-A and the second epoch 702 ($\alpha_{7\text{-}2}$) for the second radio node 202-B; and concurrently provide uplink radio access connectivity to its end-user nodes 216-A, 216-B over the second frequency bandwidth and receive backhaul information from the other radio node 202-B, 202-A over the second frequency bandwidth in the other epoch—this is the second epoch 702 ($\alpha_{7\text{-}2}$) for the first radio node 202-A and the first epoch 701 ($\alpha_{7\text{-}1}$) for the second radio node 202-B.

As described above, the control units work in a synchronized manner so that when one radio node is configured to transmit backhaul information over the second frequency bandwidth the other radio node is configured to receive backhaul information over the second frequency bandwidth and vice versa.

It is noted that in the example of FIG. 7 the uplink radio transmissions from the end-user nodes 216-B connected to the second radio node 202-B may interfere with the downlink radio transmissions to the end-user nodes 216-A connected to the first radio node 202-A. Similarly, the uplink radio transmissions from the end-user nodes 216-A connected to the first radio node 202-A may interfere with the downlink radio transmissions to the end-user nodes 216-B connected to the second radio node 202-B. Accordingly, the control units 210-A, 210-B may be configured to account for these interference levels (e.g. A9) in the maximization of the function set out in equation (7).

Although the epochs are shown in a particular order in FIG. 7—e.g. the epoch in which the second radio unit 208-A of the first radio node 202-A concurrently provides downlink radio access connectivity to its end-user nodes and transmits backhaul information is the first epoch—it will be evident to a person of skill in the art that the different epochs may be implemented in a different order in the radio frame. For example, the epoch in which the second radio unit 208-A of the first radio node 202-A concurrently provides downlink radio access connectivity to its end-user nodes and transmits backhaul information may alternatively be the second epoch.

Accordingly, the total throughput of backhaul information transmitted from the first radio node 202-A to the second radio node 202-B ($TBH_{A \to B}$) is equal to the sum of the throughput of backhaul information transmitted from the first radio node 202-A to the second radio node 202-B over the first communication link ($Th_{A \to B}^{(1)}$) and the throughput of backhaul information transmitted from the first radio node 202-A to the second radio node 202-B over the second communication link ($Th_{A \to B}^{(2)}$) as shown in equation (15); and the total throughput of backhaul information received by the first radio node 202-A from the second radio node 202-B ($TBH_{B \to A}$) is equal to the sum of the throughput of backhaul information received by the first radio node 202-A from the second radio node 202-B over the first communication link ($Th_{B \to A}^{(1)}$) and the throughput of the backhaul information received by the first radio node 202-A from the second radio node 202-B over the second communication link ($Th_{B \to A}^{(2)}$) as shown in equation (16):

$$TBH_{A \to B} = Th_{A \to B}^{(1)} + Th_{A \to B}^{(2)} \qquad (15)$$

$$TBH_{B \to A} = Th_{B \to A}^{(1)} + Th_{B \to A}^{(2)} \qquad (16)$$

Like the example described above with reference to FIG. 6, the control units 210-A, 210-B may be configured to select the duration of the epochs 701, and 702 ($\alpha_{7\text{-}1}$, $\alpha_{7\text{-}2}$) so as to maximize a function of one or more of: the total uplink radio access connectivity throughput provided by the remote radio node (e.g. the second radio node 202-B) to its end-user nodes ($Th_{B,UL}^{(2)}$); the total downlink radio access connectivity throughput provided to the end-user nodes by the remote radio node (e.g. the second radio node 202-B) ($Th_{B,DL}^{(2)}$); the total throughput of backhaul information transmitted from the first radio node 202-A to the second radio node 202-B ($TBH_{A \to B}$); and the total throughput of backhaul information transmitted from the second radio node 202-B to the first radio node 202-A ($TBH_{B \to A}$) (e.g. as shown in equation (7)).

Like the example described above with reference to FIG. 6, the maximization may be subjected to one or more constraints such as, but not limited to, the constraints described above in reference to FIG. 6 with respect to equations (8), (9), (10), (11), (12), and (13). The maximization may also, or alternatively, be under the constraint that the combined duration of the two disjointed epochs 701, 702 ($\alpha_{7\text{-}1}$, $\alpha_{7\text{-}2}$) is equal to the total duration ($\alpha_{total}$) of the radio access frame for the second frequency bandwidth ($F_{END\text{-}USER}$) as shown in equation (17):

$$\alpha_{total} = \alpha_{7\text{-}1} + \alpha_{7\text{-}2} \qquad (17)$$

Figure 8:
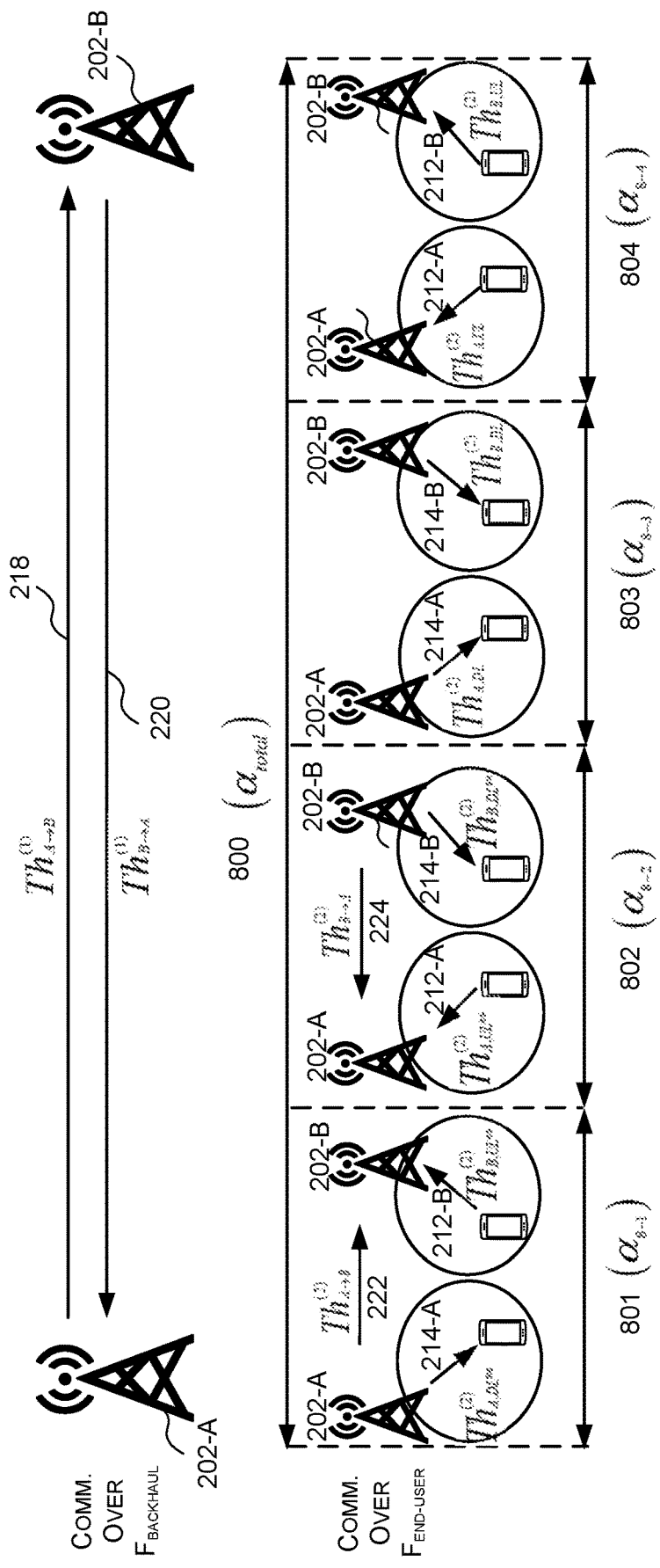
FIG. 8 is a schematic diagram illustrating a second example of a radio access frame time-partitioned to enable a pair of radio nodes to provide uplink and downlink radio access connectivity to their respective end-user nodes using the second frequency bandwidth and exchange backhaul information using the second frequency bandwidth with spatial multiplexing.

Reference is now made to FIG. 8 which illustrates a second example of how a radio access frame for the second frequency bandwidth ($F_{END\text{-}USER}$) is time partitioned into a plurality of epochs to enable the radio nodes 202-A, 202-B to provide uplink and downlink radio access connectivity to their respective end-user nodes and exchange backhaul information over the second frequency bandwidth ($F_{END\text{-}USER}$) when spatial multiplexing techniques are supported by the radio nodes 202-A, 202-B (e.g. in block 410 of the method 400 of FIG. 4). In this example, the control units 210-A, 210-B time partition the radio access frame for the second frequency bandwidth ($F_{END\text{-}USER}$) into four disjoint (i.e. non-overlapping) epochs 801, 802, 803, 804 ($\alpha_{8\text{-}1}$, $\alpha_{8\text{-}2}$, $\alpha_{8\text{-}3}$, $\alpha_{8\text{-}4}$).

The control units 210-A, 210-B are then configured to cause their corresponding second radio unit 208-A, 208-B to:

concurrently provide downlink radio access connectivity to its end-user nodes 216-A, 216-B over the second frequency bandwidth and transmit backhaul information to the other radio node 202-B, 202-A using the second frequency bandwidth in one epoch—this is the first epoch 801 ($\alpha_{8\text{-}1}$) for the first radio node 202-A and the second epoch 802 ($\alpha_{8\text{-}2}$) for the second radio node 202-B;

concurrently provide uplink radio access connectivity to its end-user nodes over the second frequency bandwidth and receive backhaul information from the other radio node 202-B, 202-A over the second frequency bandwidth—this is the second epoch 802 ($\alpha_{8\text{-}2}$) for the first radio node 202-A and the first epoch 801 ($\alpha_{8\text{-}1}$) for the second radio node 202-B;

only provide downlink radio access connectivity to its end-user nodes 216-A, 216-B in yet another epoch 803 ($\alpha_{8\text{-}3}$); and only provide uplink radio access connectivity to its end-user nodes 216-A, 216-B in the final epoch 804 ($\alpha_{8\text{-}4}$).

As described above, the control units work in a synchronized manner so that when one radio node is configured to transmit backhaul information over the second frequency bandwidth the other radio node is configured to receive backhaul information over the second frequency bandwidth and vice versa.

It is noted that in the example of FIG. 8 the uplink radio transmissions from the end-user nodes 216-B connected to the second radio node 202-B may interfere with the downlink radio transmissions to the end-user nodes 216-A connected to the first radio node 202-A. Similarly, the uplink radio transmissions from the end-user nodes 216-A connected to the first radio node 202-A may interfere with the downlink radio transmissions to the end-user nodes 216-B connected to the second radio node 202-B. Accordingly, the control units 210-A, 210-B may be configured to account for these interference levels (e.g. A9) in the maximization of the function set out in equation (7).

Although the different types of epochs are shown in FIG. 8 in a particular order—e.g. the epoch in which the second radio unit 208-A of the first radio node 202-A concurrently provides downlink radio access connectivity to its end-user nodes and transmits backhaul information is the first epoch—it will be evident to a person of skill in the art that the different epochs may be implemented in a different order in the radio frame. For example, the epoch in which the second radio unit 208-A of the first radio node 202-A concurrently provides downlink radio access connectivity to its end-user nodes and transmits backhaul information may alternatively be the second epoch.

In this example, like the examples described above with respect to FIGS. 6 and 7, the total throughput of backhaul information transmitted from the first radio node 202-A to the second radio node 202-B ($\text{TBH}_{A \to B}$) is equal to the sum of the throughput of backhaul information transmitted from the first radio node 202-A to the second radio node 202-B over the first communication link ($\text{Th}_{A \to B}^{(1)}$) and the throughput of backhaul information transmitted from the first radio node 202-A to the second radio node 202-B over the second communication link ($\text{Th}_{A \to B}^{(2)}$) during the first epoch 801 ($\alpha_{8\text{-}1}$) as shown in equation (18); and the total throughput of backhaul information received by the first radio node 202-A from the second radio node 202-B ($\text{TBH}_{B \to A}^{(1)}$) is equal to the sum of the throughput of backhaul information received by the first radio node 202-A from the second radio node 202-B over the first communication link ($\text{Th}_{B \to A}^{(1)}$) and the throughput of the backhaul information received by the first radio node 202-A from the second radio node 202-B over the second communication link ($\text{Th}_{B \to A}^{(2)}$) during the second epoch 802 ($\alpha_{8\text{-}2}$) as shown in equation (19):

$$\text{TBH}_{A \to B} = Th_{A \to B}^{(1)} + Th_{A \to B}^{(2)} \tag{18}$$

$$\text{TBH}_{B \to A} = Th_{B \to A}^{(1)} + Th_{B \to A}^{(2)} \tag{19}$$

Similar to the examples described above with respect to FIGS. 6 and 7, in this example the control units 210-A, 210-B may be configured to select the duration of the epochs 801, 802, 803, 804 ($\alpha_{8\text{-}1}, \alpha_{8\text{-}2}, \alpha_{8\text{-}3}, \alpha_{8\text{-}4}$) so as to maximize a function of one or more of: the total uplink radio access connectivity throughput provided by the remote radio node (e.g. the second radio node 202-B) to its end-user nodes ($\text{Th}_{B,UL}^{(2)}{}+\text{Th}_{B,UL}^{(2)}$); the total downlink radio access connectivity throughput provided to the end-user nodes by the remote radio node (e.g. the second radio node 202-B) ($\text{Th}_{B,DL}^{(2)}{}+\text{Th}_{B,DL}^{(2)}$); the total throughput of backhaul information transmitted from the first radio node 202-A to the second radio node 202-B ($\text{TBH}_{A \to B}$); and the total throughput of backhaul information transmitted from the second radio node 202-B to the first radio node 202-A ($\text{TBH}_{B \to A}$).

However, in this example since there are two epochs in which uplink radio access connectivity is provided to end-user nodes and two epochs in which downlink radio access connectivity is provided to end-user nodes, the total downlink/uplink radio access connectivity throughput provided to the end-user nodes by the remote radio node (e.g. the second radio node 202-B) is the sum of the downlink/uplink radio access connectivity throughput in each of the relevant epochs. Specifically, the total downlink radio access connectivity throughput provided to the end-user nodes connected to the second radio node 202-B is equal to the sum of the downlink radio access connectivity throughput provided to the end-user nodes connected to the second radio node 202-B in the second epoch 802 ($\alpha_{8\text{-}2}$) ($\text{Th}_{B,DL}^{(2)}{}$) and the downlink radio access connectivity throughput provided to the end-user nodes connected to the second radio node 202-B in the third epoch 803 ($\alpha_{8\text{-}3}$) ($\text{Th}_{B,DL}^{(2)}$); and the total uplink radio access connectivity throughput provided to the end-user nodes connected to the second radio node 202-B is equal to the sum of the uplink radio access connectivity throughput provided to the end-user nodes connected to the second radio node 202-B in the first epoch 801 ($\alpha_{8\text{-}1}$)($\text{Th}_{B,UL}^{(2)}{}$) and the uplink radio access connectivity throughput provided to the end-user nodes connected to the second radio node 202-B in the fourth epoch 804 ($\alpha_{8\text{-}4}$)($\text{Th}_{B,UL}^{(2)}$).

Like the examples described above with respect to FIGS. 6 and 7, the maximization may be subjected to one or more constraints. For example, the maximization may be under the constraint that the total uplink and downlink radio access connectivity throughputs provided by the remote radio node (e.g. the second radio node 202-B) to its end-user nodes ($\text{Th}_{B,UL}^{(2)}{}+\text{Th}_{B,UL}^{(2)}$, $\text{Th}_{B,DL}^{(2)}{}+\text{Th}_{B,DL}^{(2)}$) can be backhauled over the first and second communication links 218, 220, 222, 224. For example, the maximization may be under the constraint that the total throughput of backhaul information transmitted from the first radio node 202-A to the second radio node 202-B ($\text{TBH}_{A \to B}$) is greater than or equal to the total downlink radio access connectivity throughput provided by the second radio node 202-B to its end-user nodes ($\text{Th}_{B,DL}^{(2)}{}+\text{Th}_{B,DL}^{(2)}$) as shown in equation (20); and/or the constraint that the total throughput of backhaul information transmitted from the second radio node 202-B to the first radio node 202-A (TBH$_{B \to A}$) is greater than or equal to the total uplink radio access connectivity throughput provided by the second radio node 202-B to its end-user nodes (Th$_{B,UL}^{(2)}$+Th$_{B,UL}^{(2)}$) as shown in equation (21):

$$TBH_{A \to B} \geq Th_{B,DL}^{(2)**} + Th_{B,DL}^{(2)} \quad (20)$$

$$TBH_{B \to A} \geq Th_{B,UL}^{(2)**} + Th_{B,UL}^{(2)} \quad (21)$$

The maximization may also, or alternatively, be under the constraint that the uplink and/or downlink radio access throughput provided by the remote radio node (e.g. the second radio node 202-B) to its end-user nodes 216-B does not fall below a predetermined threshold (which may be the same or different for the uplink and downlink throughputs). For example, the maximization may be under the constraint that the total uplink radio access connectivity throughput provided by the remote radio node (e.g. the second radio node 202-B) to its end-user nodes (Th$_{B,UL}^{(2)}$+Th$_{B,UL}^{(2)}$) is greater than or equal to a predetermined threshold ($\gamma_1$) as shown in equation (22); and/or the constraint that the total downlink radio access connectivity throughput provided by the remote radio node (e.g. the second radio node 202-B) to its end-user nodes 216-B (Th$_{B,DL}^{(2)}$+Th$_{B,DL}^{(2)}$) is greater than or equal to a threshold ($\gamma_2$) as shown in equation (23):

$$Th_{B,UL}^{(2)**} + Th_{B,UL}^{(2)} \geq \gamma_1 \quad (22)$$

$$Th_{B,DL}^{(2)**} + Th_{B,DL}^{(2)} \geq \gamma_2 \quad (23)$$

The maximization may also, or alternatively, be under the constraint that the uplink and/or downlink throughput provided by the anchor radio node (e.g. the first radio node 202-A) to its end-user nodes 216-A does not fall below a predetermined threshold (which may be the same or different for the uplink and downlink throughputs). In this example since there are two epochs in which uplink radio access connectivity is provided to end-user nodes and two epochs in which downlink radio access connectivity is provided to end-user nodes, the total downlink/uplink radio access connectivity throughput provided to the end-user nodes by the anchor radio node (e.g. the first radio node 202-A) is the sum of the downlink/uplink radio access connectivity throughput in each of the relevant epochs. Specifically, the total downlink radio access connectivity throughput provided to the end-user nodes connected to the first radio node 202-A is equal to the sum of the downlink radio access connectivity throughput provided to the end-user nodes connected to the first radio node 202-A in the first epoch 801 ($\alpha_{8-1}$)(Th$_{A,DL}^{(2)}$) and the downlink radio access connectivity throughput provided to the end-user nodes connected to the first radio node 202-A in the third epoch 803 ($\alpha_{8-3}$) (Th$_{A,DL}^{(2)}$); and the total uplink radio access connectivity throughput provided to the end-user nodes connected to the first radio node 202-A is equal to the sum of the uplink radio access connectivity throughput provided to the end-user nodes connected to the first radio node 202-A in the second epoch 802 ($\alpha_{8-2}$) (Th$_{A,UL}^{(2)}$) and the uplink radio access connectivity throughput provided to the end-user nodes connected to the first radio node 202-A in the fourth epoch 804 ($\alpha_{8-4}$)(Th$_{A,UL}^{(2)}$).

For example, the maximization may be under the constraint that the total uplink radio access connectivity throughput provided by the first radio node 202-A to its end-user nodes (Th$_{A,UL}^{(2)}$+Th$_{A,UL}^{(2)}$) is greater than or equal to a predetermined threshold ($\gamma_3$) as shown in equation (24); and/or the constraint that the total downlink radio access connectivity throughput provided by the first radio node 202-A to its end-user nodes (Th$_{A,DL}^{(2)}$+Th$_{A,DL}^{(2)}$) is greater than or equal to a threshold ($\gamma_4$) as shown in equation (25):

$$Th_{A,UL}^{(2)**} + Th_{A,UL}^{(2)} \geq \gamma_3 \quad (24)$$

$$Th_{A,DL}^{(2)**} + Th_{A,DL}^{(2)} \geq \gamma_4 \quad (25)$$

The maximization may also, or alternatively, be under the constraint that the combined duration of the four disjointed epochs 801, 802, 803, 804 ($\alpha_{8-1}$, $\alpha_{8-2}$, $\alpha_{8-3}$, $\alpha_{8-4}$) is equal to the total duration ($\alpha_{total}$) of the radio access frame for the second frequency bandwidth (F$_{END-USER}$) as shown in equation (26):

$$\alpha_{total} = \alpha_{8-1} + \alpha_{8-2} + \alpha_{8-3} + \alpha_{8-4} \quad (26)$$

Since there are multiple epochs (e.g. epochs 802 ($\alpha_{8-2}$) and 804 ($\alpha_{8-4}$)) in which uplink radio access connectivity is provided by the first radio node 202-A to its end-user nodes 216-A and multiple epochs (e.g. epochs 801 ($\alpha_{8-1}$) and 803 ($\alpha_{8-3}$)) in which downlink radio access connectivity is provided by the first radio node 202-A to its end-user nodes 216-A, where the first radio node 202-A is configured to provide uplink and downlink radio access connectivity to a plurality of end-user nodes 216-A the control unit 210-A may be configured to select the end-user nodes to be allocated or scheduled in the uplink and/or downlink epochs in order to maximize the function described above.

Similarly, since there are multiple epochs (e.g. epochs 801 ($\alpha_{8-1}$) and 804 ($\alpha_{8-4}$)) in which uplink radio access connectivity is provided by the second radio node 202-B to its end-user nodes 216-B and multiple epochs (e.g. epochs 802 ($\alpha_{8-2}$) and 803 ($\alpha_{8-3}$)) in which downlink radio access connectivity is provided by the second radio node 202-B to its end-user nodes 216-B, where the second radio node 202-B is configured to provide uplink and downlink radio access connectivity to a plurality of end-user nodes 216-B the control unit 210-B may be configured to select the end-user nodes to be allocated or scheduled in the uplink and/or downlink epochs in order to maximize the function described above.

For example, the control units 210-A, 210-B may be configured to cause the corresponding second radio unit to provide downlink radio access connectivity to a first subset of the plurality of end-user nodes during one epoch (such as epoch 801 ($\alpha_{8-1}$) for the first radio node 202-A or epoch 802 ($\alpha_{8-2}$) for the second radio node 202-B) and provide downlink radio access connectivity to a different subset of the plurality of end-user nodes in another epoch (such as epoch 803 ($\alpha_{8-3}$)) so as to maximize a function based on one or more of an uplink radio access connectivity throughput provided to the plurality of end-user nodes, a downlink radio access connectivity throughput provided to the plurality of end-user nodes, a throughput of the backhaul information transmitted to the other radio node via the second communication link 222, 224 over the second frequency bandwidth, and a throughput of the backhaul information received from the other radio node via the second communication link 222, 224 over the second frequency bandwidth.

Similarly, the control units 210-A, 210-B may be configured, in addition, or alternatively, to cause the corresponding second radio unit to provide uplink radio access connectivity to a first subset of the plurality of end-user nodes during one epoch (such as epoch 802 ($\alpha_{8-2}$) for the first radio node 202-A or epoch 801 ($\alpha_{8-1}$) for the second radio node 202-B) and provide uplink radio access connectivity to a different subset of the plurality of end-user nodes in another epoch (such as epoch 804 ($\alpha_{8-4}$)) so as to maximize a function based on one or more of an uplink radio access connectivity throughput provided to the plurality of end-user nodes, a downlink radio access connectivity throughput provided to the plurality of end-user nodes, a throughput of the backhaul information transmitted to the other radio node via the second communication link over the second frequency bandwidth, and a throughput of the backhaul information received from the other radio node via the second communication link over the second frequency bandwidth.

Partitioning the radio access frame as described with respect to FIG. 8 allows finer control over the downlink and uplink radio access throughput provided to end-user nodes as the uplink access for end-user nodes can be divided between an epoch in which the second frequency bandwidth is dedicated to providing uplink radio access connectivity only and an epoch in which the second frequency bandwidth is used for providing uplink radio access connectivity and receiving backhaul information; and/or the downlink access for end-user nodes can be divided between an epoch in which the second frequency bandwidth is dedicated to providing downlink radio access connectivity only and an epoch in which the second frequency bandwidth is used for providing downlink radio access connectivity and transmitting backhaul information. It also allows a larger portion of the frame (i.e. two epochs) to provide uplink and/or downlink radio access connectivity because spatial multiplexing enables co-existence of backhauling and radio access connectivity over the second frequency bandwidth.

Figure 9:
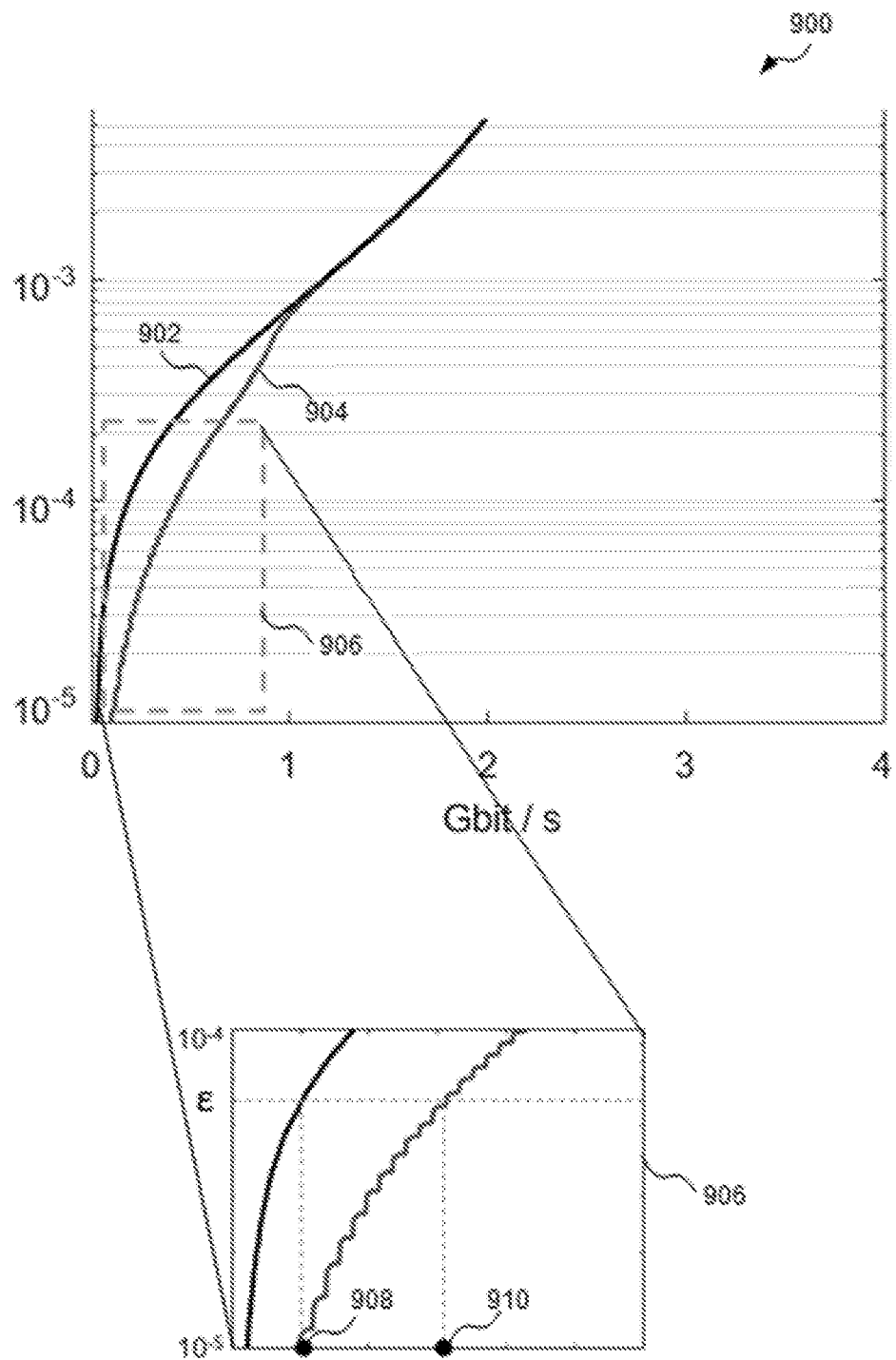
FIG. 9 is a graph of the cumulative distribution function of the backhaul information throughput for a backhauling system of FIG. 2.

Reference is now made to FIG. 9 which is a graph 900 of the cumulative distribution function of the backhaul information throughput for a conventional microwave backhauling system, such as the system 100 of FIG. 1A, and for a backhauling system 200 described herein. Specifically curve 902 is the cumulative distribution function of the backhaul information throughput for a conventional microwave backhauling system, such as the system 100 of FIG. 1A, where the backhaul information is transmitted over a single dedicated point-to-point radio backhaul link established over a microwave frequency bandwidth; and curve 904 is the cumulative distribution function of the backhaul information throughput for the backhauling system 200 described herein where the backhaul information is transmitted jointly over a dedicated point-to-point radio backhaul link established over a microwave frequency bandwidth ($F_{BACKHAUL}$) and over a second communication link established over the frequency bandwidth ($F_{END-USER}$) used to provide uplink and downlink radio access connectivity to the end-user nodes in an adaptive or dynamic manner as described above.

The magnified section 906 of FIG. 9 shows that the backhaul information throughput that is guaranteed for (1−ε)*100% amount of the time for the backhauling system 200 described herein (indicated at 910) is greater than the backhaul information throughput that is guaranteed for (1−ε)*100% amount of the time for a conventional microwave backhauling system (indicated at 908) wherein E is the normalized probability on the y-axis. Accordingly, the backhauling system 200 described herein may increase the backhaul information throughput that is guaranteed for (1−ε)*100% amount of the time.

Figure 10:
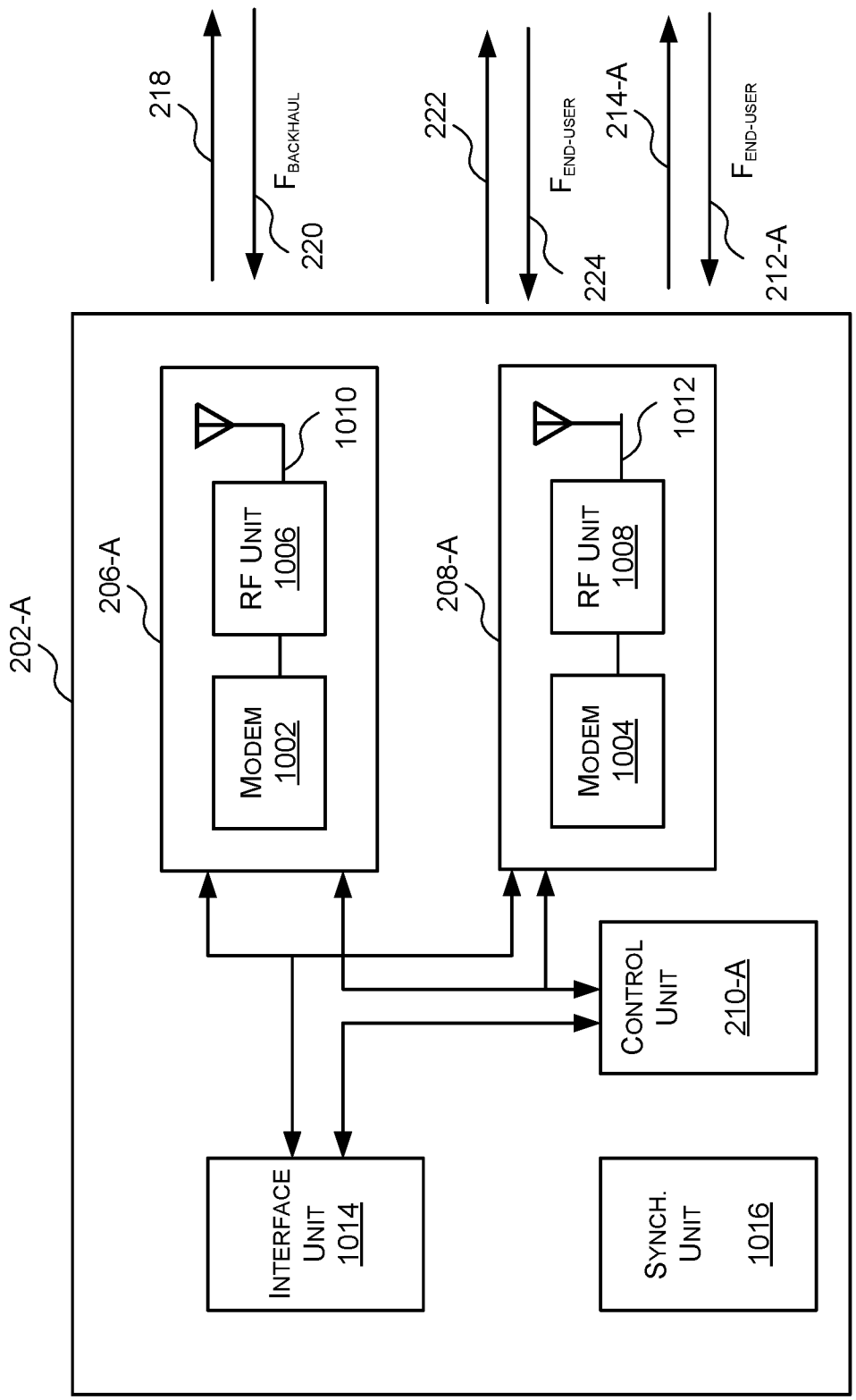
FIG. 10 is a block diagram of an example radio node.

Reference is now made to FIG. 10 which illustrates a block diagram of an example implementation of the first radio node 202-A. In the example of FIG. 10 the first radio node 202-A comprises the first radio unit 206-A, the second radio unit 208-A and the control unit 210-A described above. Each radio unit 206-A and 208-A comprises a modem 1002, 1004, a radio frequency (RF) unit 1006, 1008, and an antenna unit 1010, 1012 that comprises one or more antenna elements.

As described above, the control unit 210-A generates and outputs one or more control signals which cause the first radio unit 206-A to transmit backhaul information to one or more other radio nodes (e.g. the second radio node 202-B) using the first frequency bandwidth ($F_{BACKHAUL}$) or cause the first radio unit 206-A to receive backhaul information from another radio node (e.g. the second radio node 202-B) using the first frequency bandwidth ($F_{BACKHAUL}$).

When the first radio unit 206-A is configured to receive backhaul information from another radio node, an incoming signal 220 from another radio node in the first frequency bandwidth ($F_{BACKHAUL}$) is intercepted by the antenna unit 1010. The antenna unit 1010 then provides the incoming signal to the RF unit 1006. The RF unit 1006 performs well-known RF processing on the incoming signal such as, but limited to, amplification, down-conversion, automatic gain control, filtering and/or any combination thereof. The processed signal is then provided to the modem 1002 for baseband processing of the signal.

When the first radio unit 206-A is configured to transmit backhaul information to one or more other radio nodes, the modem 1002 outputs one or more signals that are provided to the RF unit 1006. The RF unit 1006 performs well-known RF operations on the input signals, such as, but not limited to, filtering, up-conversion, amplification, recombination and/or any combination thereof. Accordingly, the RF unit 1006 may be implemented in hardware by one or more of a filter, up-converter, amplifier, and/or a multiplier. The RF unit 1006 then provides the processed one or more RF signals to the antenna unit 1010 which transmits the signals 218 using the first frequency bandwidth ($F_{BACKHAUL}$).

The frequency bandwidth of the received signals 220 and/or the transmitted signals 218 may have a frequency bandwidth that corresponds to the first frequency bandwidth ($F_{BACKHAUL}$) or a portion thereof based on the specific frequency planning, duplexing mode and scheduling policy employed. For example, if the first radio unit 206-A implements TDD the totality of the first frequency bandwidth ($F_{BACKHAUL}$) may be assigned or allocated to both the transmitted signal and the received signal. However, if the first radio unit implements FDD the transmitted signal and the received signals occur over orthogonal spectral regions within the first frequency bandwidth ($F_{BACKHAUL}$).

As described above, the control unit 210-A also generates one or more control signals to cause the second radio unit 208-A to: provide uplink radio access connectivity to one or more end-user nodes using the second frequency bandwidth ($F_{END-USER}$), provide downlink radio access connectivity to one or more end-user nodes using the second frequency bandwidth ($F_{END-USER}$), transmit backhaul information to another radio node using the second frequency bandwidth ($F_{END-USER}$), and/or receive backhaul information from another radio node using the second frequency bandwidth ($F_{END-USER}$).

When the second radio unit 208-A is configured to receive backhaul information from another radio node, and/or provide uplink radio access connectivity to one or more end-user nodes, an incoming signal 224, 212-A in the second frequency bandwidth ($F_{END-USER}$) is intercepted by the antenna unit 1012. The antenna unit 1012 then provides the incoming signal to the RF unit 1008. The RF unit 1008 performs well-known RF processing on the incoming signal such as, but limited to, amplification, down-conversion, automatic gain control, filtering and/or any combination thereof. The processed signal is then provided to the modem 1004 for baseband processing of the signal.

When the second radio unit 208-A is configured to transmit backhaul information to one or more other radio nodes, and/or, provide downlink radio access connectivity to one or more end-user nodes, the modem 1004 outputs one or more signals that are provided to the RF unit 1008. The RF unit 1008 performs well-known RF operations on the input signals, such as, but not limited to, filtering, up-conversion, amplification, recombination and/or any combination thereof. Accordingly, the RF unit 1008 may be implemented in hardware by one or more of a filter, up-converter, amplifier, and/or a multiplier. The RF unit 1008 then provides the processed RF signal to the antenna unit 1012 which transmits the signal 222, 214-A using the second frequency bandwidth ($F_{END-USER}$).

The frequency bandwidth of the received signals 224, 212-A and/or the transmitted signals 222, 214-A may have a frequency bandwidth that corresponds to the second frequency bandwidth ($F_{END-USER}$) or a portion thereof based on the specific frequency planning, duplexing mode and scheduling policy employed. For example, if the first radio unit implements TDD the totality of the second frequency bandwidth ($F_{END-USER}$) may be assigned or allocated to both the transmitted signals 222, 214-A and the received signals 224, 212-A. However, if the second radio unit implements FDD the transmitted signals 222, 214-A and the received signals 224, 212-A occur over orthogonal spectral regions within the second frequency bandwidth ($F_{END-USER}$).

In some cases, the antenna unit 1012 may comprise a plurality of antenna elements (not shown) to support multiple-input-multiple-output (MIMO) communications. Each of the antenna elements may be adapted to be coupled to a tunable circuit with variable phase and amplitude response. An antenna element may, for example, be an elementary waveguide radiator, a cluster of radiators, a parabolic antenna or any other suitable antenna element.

The modem 1004 may comprise one or more functional modules for processing received signals or generating signals for transmission. The functional modules may include one or more of: a functional module for performing conventional baseband processing such as modulation/demodulation and coding/decoding; a functional module to perform MIMO processing tasks to leverage the spatial multiplexing and diversity gains that can be provided with multiple antenna elements 1012; a functional module to perform power adaption, bit loading and/or spatial mode selection; and a functional module to provide support for medium access control and radio resource management tasks.

The radio node 202-A may also comprise an interface unit 1014 that is configured to adapt information received by the second radio unit over the second frequency bandwidth ($F_{END-USER}$) to a suitable format (e.g. a suitable frame format) for transmission by the second radio unit over the second frequency bandwidth ($F_{END-USER}$) or for transmission by the first radio unit over the first frequency bandwidth ($F_{BACKHAUL}$); and to adapt information received by the first radio unit over the first frequency bandwidth ($F_{BACKHAUL}$) to a suitable format (e.g. a suitable frame format) for transmission by the second radio unit over the second frequency bandwidth ($F_{END-USER}$) or for transmission by the first radio unit over the first frequency bandwidth ($F_{BACKHAUL}$). Specifically, the interface unit 1014 may be configured to convert backhaul information to uplink/downlink radio access information and vice versa. The amount of information that is transmitted through each radio unit may be dictated by the control signals generated by the control unit 210-A.

The radio node 202-A may also comprise a synchronization unit 1016 that is configured to synchronize the operation of the radio node (and in particular the control unit 210-A) with the operation of one or more other radio nodes (and, in particular, the control units thereof). In some examples, the synchronization unit 1016 may be configured to perform frequency and time synchronization tasks. For example, in some cases, the synchronization unit 1016 may be configured to obtain synchronization information, such as signals emitted by Global Navigation Satellite System (GNSS) transmitters and use that to ensure that the radio node (and in particular the control unit) is operating in accordance with the synchronization information. In other cases, the synchronization unit may be alternatively, or additionally, configured to implement synchronization functionalities prescribed by the IEEE 1588 Precision Time Protocol for enabling distributed network synchronization.

Although FIG. 10 illustrates an example of the first radio node 202-A, it will be evident to a person of skill in the art that the second radio node 202-B may be implemented in a similar manner as that shown in FIG. 10.

The applicant hereby discloses in isolation each individual feature described herein and any combination of two or more such features, to the extent that such features or combinations are capable of being carried out based on the present disclosure as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the present disclosure.

The invention claimed is:

1. A control unit for controlling a radio node comprising a first radio unit and a second radio unit, the control unit configured to:
generate and output one or more control signals to cause:
the first radio unit to exchange a first portion of backhaul information with another radio node over a first communication link established using a first frequency bandwidth (Fbackhaul);
the second radio unit to provide uplink and downlink radio access connectivity to one or more end-user nodes using a second frequency bandwidth (Fend-user); and
the second radio unit to exchange a second portion of the backhaul information with the other radio node over a second communication link established using the second frequency bandwidth (Fend-user);
divide a radio access frame into at least two epochs based on a determination that a quality of the first communication link is less than a minimum quality and that the second radio unit supports spatial multiplexing; and
cause the second radio unit to one or more of:
concurrently provide downlink radio access connectivity to one or more end-user nodes and transmit backhaul information to the other radio node using the second frequency bandwidth (Fend-user) during one epoch of the at least two epochs; and
concurrently provide uplink radio access connectivity to one or more end- user nodes and receive backhaul information from the other radio node using the second frequency bandwidth (Fend-user) during another epoch of the at least two epochs.

2. The control unit of claim 1, wherein the control unit is configured to dynamically allocate none or a portion of the second frequency bandwidth (Fend-user) for use in establishing the second communication link based at least on the determined quality of the first communication link.

3. The control unit of claim 1, wherein the control unit is configured to allocate none of the second frequency bandwidth for use in establishing the second communication link based on a determination that the quality of the first communication link is greater than or equal to the minimum quality, and allocate a portion of the second frequency bandwidth (Fend-user) for use in establishing the second communication link) based on the determination that the quality of the first communication link is less than the minimum quality.

4. The control unit of claim 3, wherein the control unit is configured to determine that the quality of the first communication link is less than the minimum quality in response to determining that a throughput of the backhaul information transmitted from the first radio unit over the first communication link is less than a first threshold, and/or that a throughput of the backhaul information received by the first radio unit over the first communication link is less than a second threshold.

5. The control unit of claim 3, wherein the control unit is configured to, in response to determining that the quality of the first communication link is greater than or equal to the minimum quality, divide the radio access frame into two epochs and cause the second radio unit to:
only provide the downlink radio access connectivity to the one or more end-user nodes in one epoch of the two epochs; and
only provide the uplink radio access connectivity to the one or more end-user nodes in the other epoch of the two epochs.

6. The control unit of claim 3, wherein the control unit is configured to, based on the determination that the quality of the first communication link is less than the minimum quality and a determination that the second radio unit does not support spatial multiplexing, divide the radio access frame into four epochs and cause the second radio unit to:
provide the downlink radio access connectivity to the one or more end-user nodes using the second frequency bandwidth (Fend-user) in one epoch of the four epochs;
provide and the uplink radio access connectivity to the one or more end-user nodes using the second frequency bandwidth (Fend-user) in another epoch of the four epochs;
transmit the backhaul information to the other radio node using the second communication link in yet another epoch of the four epochs; and
receive the backhaul information from the other radio node via the second communication link in the remaining epoch of the four epochs.

7. The control unit of claim 3, wherein the control unit is configured to, based on the determination that the quality of the first communication link is less than the minimum quality and that the second radio unit supports spatial multiplexing, divide the radio access frame into four epochs and cause the second radio unit to:
concurrently provide the downlink radio access connectivity to one or more end-user nodes and transmit the backhaul information to the other radio node using the second frequency bandwidth (Fend-user) during one epoch of the four epochs;
concurrently provide the uplink radio access connectivity to the one or more end-user nodes and receive backhaul information from the other radio node using the second frequency bandwidth (Fend-user) during another epoch of the four epochs;
only provide the downlink radio access connectivity to the one or more end-user nodes using the second frequency bandwidth (Fend-user) during yet another epoch of the four epochs; and
only provide the uplink radio access connectivity to the one or more end-user nodes using the second frequency bandwidth (Fend-user) during the remaining epoch of the four epochs.

8. The control unit of claim 7, wherein the second radio unit is configured to provide uplink and downlink radio access connectivity to a plurality of end-user nodes; and the control unit is configured to:
cause the second radio unit to provide downlink radio access connectivity to a first subset of the plurality of end-user nodes during the one epoch of the four epochs and to provide downlink radio access connectivity to a different subset of the plurality of end-user nodes in the yet another epoch of the four epochs so as to maximize a function of one or more of:
an uplink radio access connectivity throughput provided to the plurality of end-user nodes,
a downlink radio access connectivity throughput provided to the plurality of end-user nodes, a throughput of the backhaul information transmitted to the other radio node via the second communication link over the second frequency bandwidth (Fend-user), and
a throughput of the backhaul information received from the other radio node via the second communication link over the second frequency bandwidth (Fend-user).

9. The control unit of claim 3, wherein the control unit is configured to, in response to determining that the quality of the first communication link is less than the minimum quality and that the second radio unit supports spatial multiplexing, divide the radio access frame into two epochs and cause the second radio unit to:
concurrently provide the downlink radio access connectivity to the one or more end-user nodes and transmit the backhaul information to the other radio node using the second frequency bandwidth (Fend-user) during one epoch of the two epochs; and
concurrently provide the uplink radio access connectivity to the one or more end-user nodes and receive the backhaul information from the other radio node using the second frequency bandwidth (Fend-user) during another epoch of the two epochs.

10. The control unit of claim 1, wherein the control unit is configured to divide the radio access frame into a plurality of epochs, allocate none or a portion of the second frequency bandwidth (Fend-user) for establishing the second communication link, and, based on the determined quality of the first communication link, cause the second radio unit to one or more of:
provide the uplink radio access connectivity to the one or more end-user nodes in one epoch of the plurality of epochs using the second frequency bandwidth (Fend-user), provide the downlink radio access connectivity to the one or more end-user nodes in one epoch of the plurality of epochs using the second frequency bandwidth (Fend-user), and transmitting transmit the backhaul information to the other radio node using the second frequency bandwidth (Fend-user), and receive the backhaul information from the other radio node using the second frequency bandwidth (Fend-user).

11. The control unit of claim 10, wherein the control unit is configured to select a duration of the plurality of epochs so as to maximize a function of one or more of:

an uplink radio access connectivity throughput provided to the one or more end-user nodes, a downlink radio access connectivity throughput provided to the one or more end-user nodes, a throughput of the backhaul information transmitted to the other radio node via the second communication link over the second frequency bandwidth (Fend-user), and a throughput of the backhaul information received from the other radio node via the second communication link over the second frequency bandwidth (Fend-user).

12. The control unit of claim 10, wherein the control unit is configured to select a duration of each epoch based at least on one or more of:

an uplink radio access connectivity throughput provided by the second radio unit to the one or more end-user nodes, a downlink radio access connectivity throughput provided by the second radio unit to the one or more end-user nodes, an uplink radio access connectivity throughput provided by the other radio node to one or more end-user nodes, a downlink radio access connectivity throughput provided by the other radio node to one or more end-user nodes, a throughput of the backhaul information transmitted to the other radio node via the second communication link over the second frequency bandwidth (Fend-user), a throughput of the backhaul information received from the other radio node via the second communication link over the second frequency bandwidth (Fend-user), a throughput of backhaul information transmitted to the other radio node via the first communication link over the first frequency bandwidth (Fbackhaul), and a throughput of backhaul information received from the other radio node via the first communication link over the first frequency bandwidth (Fbackhaul).

13. A method of exchanging backhaul information between a radio node and another radio node, the method comprising:

exchanging a first portion of the backhaul information over a first communication link established using a first frequency bandwidth; and exchanging a second portion of the backhaul information over a second communication link established using a second frequency bandwidth, the second frequency bandwidth being different from the first frequency bandwidth;

dividing a radio access frame into at least two epochs based on a determination that a quality of the first communication link is less than a minimum quality and that the radio node supports spatial multiplexing; and causing the radio node to one or more of:

concurrently provide downlink radio access connectivity to one or more end-user nodes and transmit backhaul information to the other radio node using the second frequency bandwidth (Fend-user) during one epoch of the at least two epochs; and concurrently provide uplink radio access connectivity to one or more end-user nodes and receive backhaul information from the other radio node using the second frequency bandwidth (Fend-user) during another epoch of the at least two epochs.

14. A control unit for controlling a radio node comprising a first radio unit and a second radio unit, the control unit configured to:

generate and output one or more control signals to cause:

the first radio unit to exchange a first portion of backhaul information with another radio node over a first communication link established using a first frequency bandwidth (Fbackhaul);

the second radio unit to provide uplink and downlink radio access connectivity to one or more end-user nodes using a second frequency bandwidth (Fend-user);

the second radio unit to exchange a second portion of the backhaul information with the other radio node over a second communication link established using the second frequency bandwidth (Fend-user); and divide a radio access frame into a plurality of epochs, allocate none or a portion of the second frequency bandwidth (Fend-user) for establishing the second communication link, and cause the second radio unit to one or more of:

provide the uplink radio access connectivity to one or more end-user nodes using the second frequency bandwidth (Fend-user), provide the downlink radio access connectivity to one or more end-user nodes using the second frequency bandwidth (Fend-user), and transmit backhaul information to the other radio node using the second frequency bandwidth (Fend-user), and receive backhaul information from the other radio node using the second frequency bandwidth (Fend-user) based on a determined quality of the first communication link; and select a duration of each epoch based at least on one or more of:

an uplink radio access connectivity throughput provided by the second radio unit to the one or more end-user nodes, a downlink radio access connectivity throughput provided by the second radio unit to the one or more end-user nodes, an uplink radio access connectivity throughput provided by the other radio node to one or more end-user nodes, a downlink radio access connectivity throughput provided by the other radio node to one or more end-user nodes, a throughput of the backhaul information transmitted to the other radio node via the second communication link over the second frequency bandwidth (Fend-user), a throughput of the backhaul information received from the other radio node via the second communication link over the second frequency bandwidth (Fend-user), a throughput of backhaul information transmitted to the other radio node via the first communication link over the first frequency bandwidth (Fbackhaul), and a throughput of backhaul information received from the other radio node via the first communication link over the first frequency bandwidth (Fbackhaul).

\* \* \* \* \*